US006652698B1

(12) United States Patent
Tisserand et al.

(10) Patent No.: US 6,652,698 B1
(45) Date of Patent: Nov. 25, 2003

(54) METHOD AND INSTALLATION FOR MANUFACTURING PERSONALIZED COUPONS

(75) Inventors: Jacques Tisserand, Chelles (FR); Georges Tisserand, Escardes (FR)

(73) Assignee: Identis, Croissy Beaubourg (FR)

( * ) Notice: Subject to any disclaimer, the term of this patent is extended or adjusted under 35 U.S.C. 154(b) by 0 days.

(21) Appl. No.: 09/890,303

(22) PCT Filed: Jan. 28, 2000

(86) PCT No.: PCT/FR00/00196

§ 371 (c)(1),
(2), (4) Date: Jul. 27, 2001

(87) PCT Pub. No.: WO00/44572

PCT Pub. Date: Aug. 3, 2000

(30) Foreign Application Priority Data

Jan. 29, 1999 (FR) ........................................... 99 01023

(51) Int. Cl.[7] ........................ B32B 31/18; B32B 31/20; B32B 35/00; B65G 47/86

(52) U.S. Cl. ...................... 156/240; 156/269; 156/277; 156/510; 198/469.1

(58) Field of Search ................................ 156/230, 236, 156/340, 247, 277, 289, 540, 541, 542, 543, 7, 145, 182, 269, 510; 427/146, 147, 148, 149; 428/914, 13, 14; 46/125, 625, 629, 630; 283/74, 75, 77, 99, 107, 109, 112; 271/3.17, 3.24, 7, 226, 228, 229, 233, 234, 235, 241, 268, 194; 198/375, 376, 377.03, 377.07, 435, 470.1, 474.1, 750.11, 678.1, 817, 469.1; 24/457, 459, 460, 522, 523; 100/306, 307, 311, 313, 151, 152, 297

(56) References Cited

U.S. PATENT DOCUMENTS 3,580,110 A * 5/1971 Brouwer et al. ........... 74/810.1
3,591,165 A * 7/1971 McCahon et al. ....... 270/52.29
3,618,788 A * 11/1971 Murray ....................... 318/603
3,955,667 A 5/1976 Müller et al.
4,482,139 A 11/1984 Killer
4,529,302 A * 7/1985 Tisserand et al. ........... 355/100
5,035,134 A * 7/1991 Fisch ...................... 198/803.9
5,058,926 A * 10/1991 Drower ...................... 283/107
5,157,413 A * 10/1992 Nagato et al. .............. 400/208
5,637,174 A * 6/1997 Field et al. ................. 156/256
5,652,989 A * 8/1997 Chiba et al. .................. 15/102
6,066,231 A * 5/2000 Maestri et al. .............. 347/199

FOREIGN PATENT DOCUMENTS

EP 0 364 730 4/1990

* cited by examiner

*Primary Examiner*—Richard Crispino
*Assistant Examiner*—Chan Sing Po
(74) *Attorney, Agent, or Firm*—Weingarten, Schurgin, Gagnebin & Lebovici LLP

(57) ABSTRACT

An installation for manufacturing personalized coupons comprises a set of work stations with at least a feed station (110) for supplying blank coupons (C), a personalization station (120) for personalizing blank coupons (C), and a cutting-out station (130) for cutting out personalized coupons (C). A system for transporting coupons (C) between the various work stations (110, 120, 170) comprises at least one chain (1) driven in indexed manner by motor-driven sprocket wheels (2), and a set of clamps (5) mounted at a constant pitch on links of the chain (1) and co-operating with opening/closing means (37) placed in fixed positions, so that each clamp takes hold of an individual blank coupon (C), transports said coupon (C) between the various work stations, and releases the coupon (C) in a station (180) for collecting the finished or semi-finished product. Each clamp (5) has a pair of jaws for clamping a marginal zone of a coupon (C) in at least two regions thereof which are spaced apart from each other in the travel direction of the chain (1), and external abutments secured to one or other of the jaws for laterally positioning the coupon.

46 Claims, 14 Drawing Sheets

FIG. 3
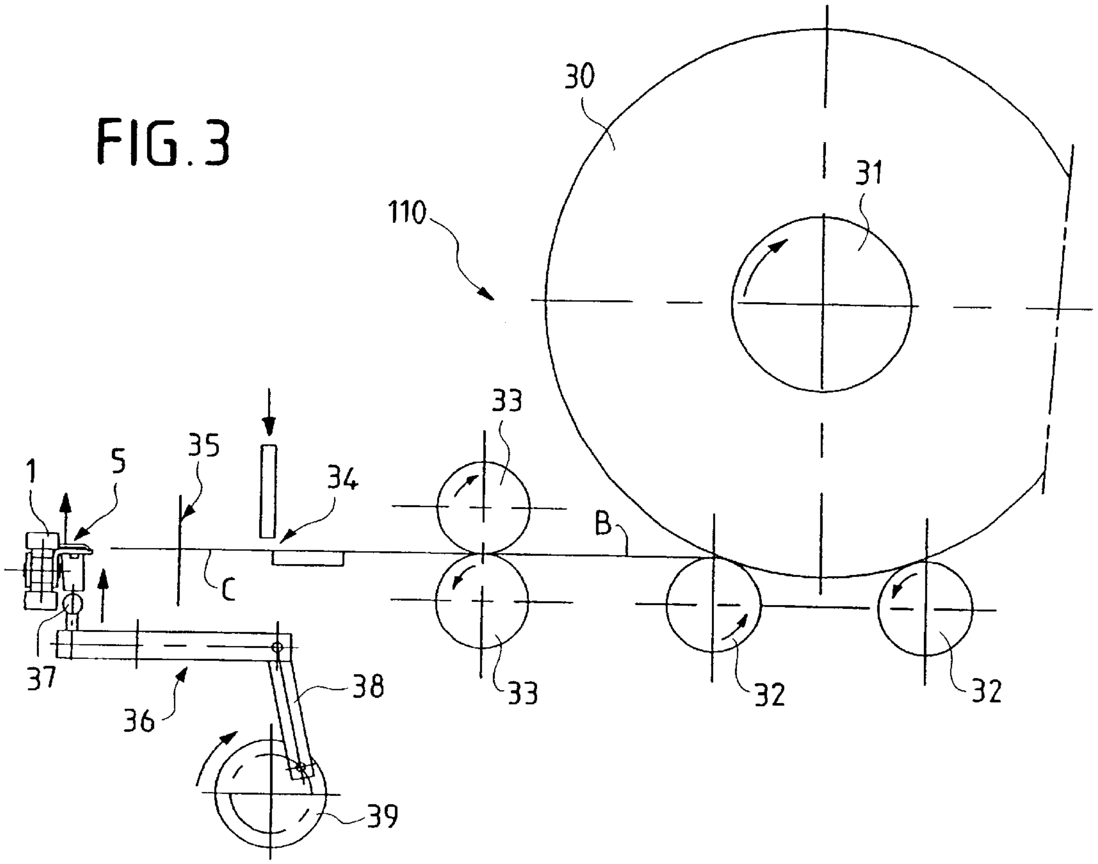
FIG. 5
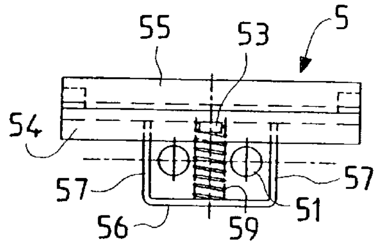
FIG. 6A
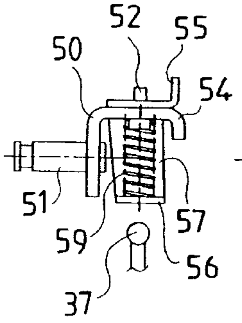
FIG. 6B
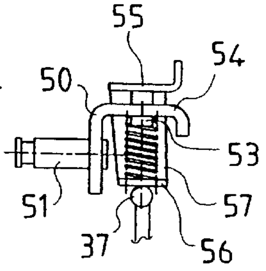
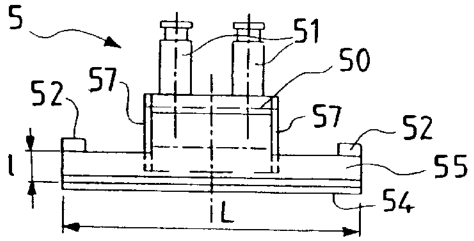
FIG. 4

FIG. 17
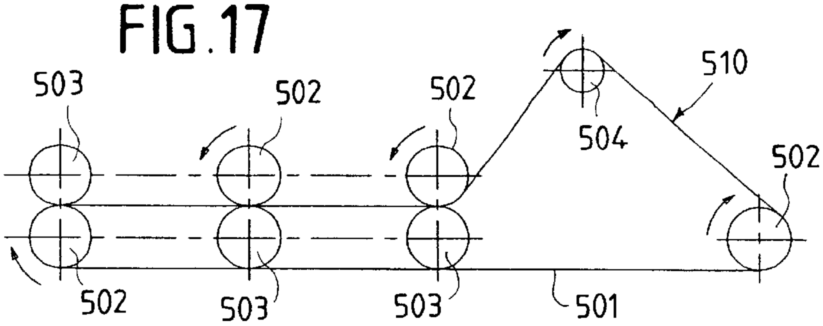
FIG. 18
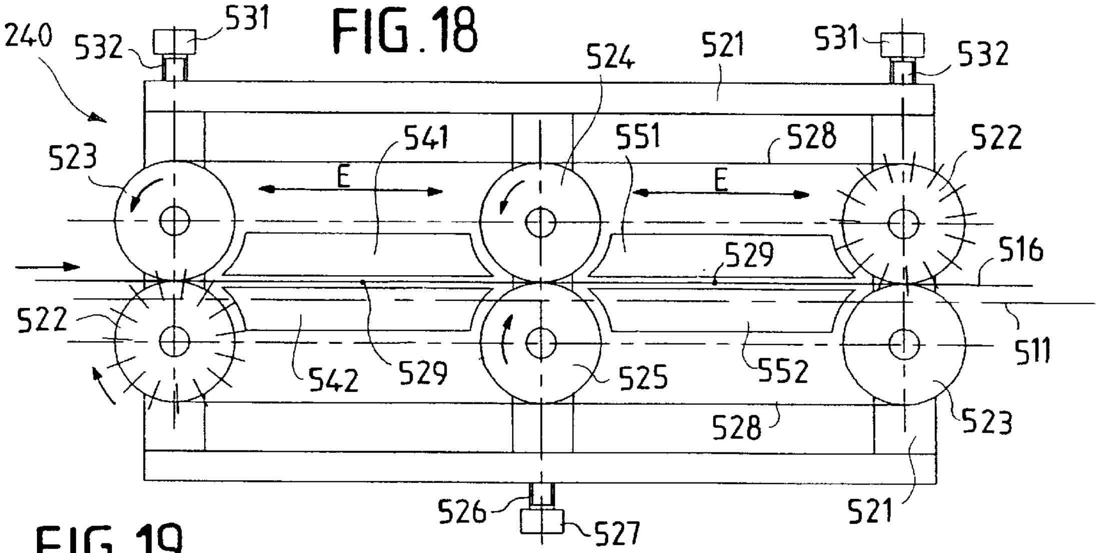
FIG. 19
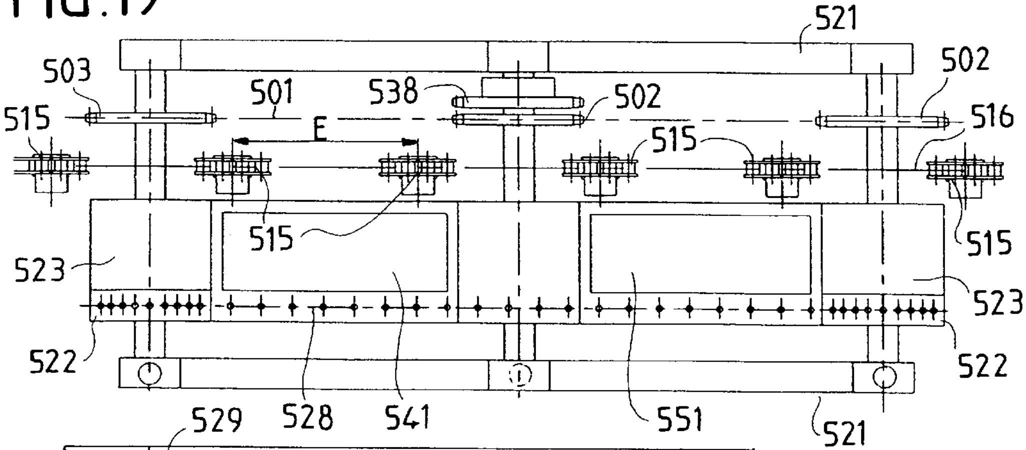
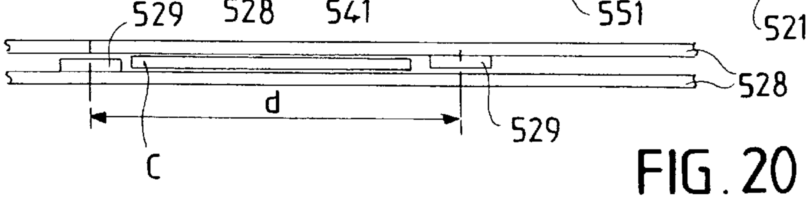
FIG. 20

METHOD AND INSTALLATION FOR MANUFACTURING PERSONALIZED COUPONS

FIELD OF THE INVENTION

The present invention relates to an installation for manufacturing personalized coupons, the installation comprising a set of work stations comprising at least a station for supplying blank coupons, a station for personalizing blank coupons, and a station for cutting out personalized coupons, together with a system for transporting coupons between the various work stations.

The invention also provides a method of manufacturing a run of personalized coupons comprising at least a step of supplying blank coupons to a first work station, a step of personalizing blank coupons in a second work station, and a step of cutting out personalized coupons in a third work station, the coupons being transported successively from one work station to another.

PRIOR ART

Various types of method and installation have already been proposed for manufacturing personalized documents such as identity cards, in particular secure identity cards, such as national identity cards, driving licenses, bank cards, social security cards, and badges. Such identity cards comprise a blank coupon or medium, e.g. made of paper or of plastics material, onto which various items of personalization information are transferred, such as information making use of alphanumeric characters or information making use of photographic images. Personalization information differs from one card to another. Security elements can also be included in the blank coupons or in additional sheets that are combined with the blank coupons, e.g. with the help of chemical inks, UV varnish, luminophores, stamping. Finally, secure and personalized coupons are often laminated in plastic.

In general, existing installations are very complex, particularly because of problems of synchronizing the various successive operations that lead to the finished cards. It is necessary to avoid any slippage between successive operations, in particular between those operations involving printing on or cutting out the various cards that are manufactured in succession on the same installation.

Known methods of manufacturing identity cards also give rise to large losses of consumables (strips of paper or plastics material for receiving the personalized information, strips of plastics material for laminating), in particular because of the leader lengths that are necessary for adjusting the installations. As a result, such known installations are not suitable for manufacturing short runs of cards, since they give rise to significant losses of material and to relatively long processing time for each manufacturing run.

Existing installations do not lend themselves easily to modifying their characteristics because they are not modular in character.

OBJECT AND BRIEF DESCRIPTION OF THE INVENTION

The invention seeks to remedy the above-specified drawbacks and to enable personalized coupons to be manufactured with excellent quality, such as identity cards, and in particular secure cards, at a cost that is low and with great flexibility in adapting to different manufacturing methods.

The invention seeks in particular to guarantee that a card manufacturing installation operates without slippage or faults occurring during production.

The invention also seeks to make it possible to engage in the manufacture of short runs of secure and personalized identity cards quickly and without loss of raw materials.

According to the invention, these objects are achieved by an installation for manufacturing personalized coupons such as identity cards, the installation comprising a set of work stations with at least a feed station for supplying blank coupons, a personalization station for personalizing blank coupons, and a cutting-out station for cutting out personalized coupons, with a system for transporting coupons between the various work stations, the installation being characterized in that the system for transporting coupons comprises a carousel having at least one chain driven in indexed manner by motor-driven sprocket wheels, and a set of clamps mounted at a constant pitch on links of the chain and co-operating with opening/closing means placed in fixed positions, so that each clamp takes hold of an individual blank coupon, transports said coupon between the various work stations, and releases the coupon in a station for collecting the finished or semi-finished product as a personalized identity card, each clamp having a pair of jaws for clamping a marginal zone of a blank coupon in at least two regions thereof which are spaced apart from each other in the travel direction of the chain, and having external abutments secured to one or other of the jaws for laterally positioning the blank coupon held between said jaws.

The clamps can be actuated mechanically, electromechanically, magnetically, or pneumatically.

In a particular embodiment, each clamp has lateral fastenings fastening it to the chain, the fastenings being located below the plane in which a coupon is held by the jaws.

Each clamp has a central spring disposed between the bottom face of the bottom jaw and a bottom plate secured to the top jaw.

Advantageously, each clamp has vertical external abutments extending upwards and secured to the bottom jaw.

Preferably, the width of engagement between the jaws of each clamp lies in the range 3 mm to 5 mm.

In a particular embodiment, the clamp opening/closing means comprises a mechanical pusher secured to a mechanism of the crank and connecting rod type.

In another particular embodiment, the clamp opening/closing means comprise an outline of a rotating cylinder.

According to a particular feature of the present invention, the feeder station for supplying blank coupons comprises a transfer and cutting station for transferring to a clamp a segment of a strip disposed transversely relative to the chain, the strip having a succession of segments constituting blank coupons.

More particularly, the feeder station has support means for supporting a storage reel of said strip, a pair of superposed cylinders between which the strip coming from the reel is pinched and which constitute a motor-driven pulling unit, a motor-driven guillotine disposed between the motor-driven puller unit and the path of the clamps, and an optical cell for monitoring the arrival of clamps in register with blank coupons to be cut off by the guillotine from segments of strip and to be held by the clamp actuated by clamp opening/closing means disposed in the vicinity of the feeder station and synchronized with the indexed advance of the chain.

The feeder station can alternatively comprise a charger of pre-cut-out blank coupons and handling means, e.g. of the suction cup type, for feeding a clamp situated at the feeder station with a blank coupon during each pause period in the cyclic operating cycle of the installation.

Advantageously, the installation of the invention has code marks on each of the clamps.

At least one coupon personalizing station can be constituted by a printer station for individualized printing on at least one of the faces of the coupons transported by the clamps.

In a particular embodiment, the card manufacturing installation comprises a pre-cutting-out station for personalized coupons, a suction cup mechanism for individually transferring pre-cut-out personalized coupons to a laminating station fed with top and bottom strips of plastics material inserted parallel to the travel direction of the pre-cut-out personalized coupons, and a station for cutting out and recovering finished personalized cards with the residual skeleton of strips of plastic material that remains after finished personalized cards have been cut out therefrom being removed and wound in a reel-forming station.

Under such circumstances, the laminating station can comprise a pair of heating shoes located where a pre-cut-out personalized coupon is inserted between said top and bottom strips of plastics material, two pairs of motor-driven cylinders that are pressed together to laminate and heat-seal a pre-cut-out personalized coupon with the top and bottom strips of plastics material, and cooling fans.

In another particular embodiment, the card manufacturing installation comprises a pre-laminating station with top and bottom rolls for supplying strips of plastics material perpendicularly to the travel direction of the chain to form a folder that encloses an insert constituted by a pre-cut-out personalized coupon held by a clamp, and a laminating station acting on the assembly constituted by said folder and its insert held by a clamp.

The pre-laminating station comprises a device for feeding to strips of plastics material with only a first longitudinal edge of each of the strips passing via a heating shoe prior to the two strips being driven through a pair of motor-driven rollers which seal the two strips together via their first longitudinal edges so as to form a double film that is held open by a spacer prior to receiving said insert and constituting a folder after being cut by a device for cutting the double film transversely so as to form a sandwich driven towards a laminating station by the central insert held by a clamp.

Advantageously, each of the strips of plastics material is constituted by a film of a base material such as polyester provided with a coating layer compatible with the insert and favoring heat-sealing, such as polyethylene, and the top and bottom strips of plastics material have their coating layers facing each other.

In another particular embodiment, the card manufacturing installation comprises a laminating station having first and second perforated metal bands welded to form endless loops and motor-driven by a set of four cylinders of which two non-opposing cylinders are fitted laterally with sprocket wheels, the first and second metal bands presenting respective parallel path portions in which they hold at least one assembly constituted by said folder and its insert held by a clamp, said parallel path portions passing successively via heating shoes, a pair of laminating cylinders, and cooling means.

The drive members of the laminating station are synchronized with the indexed drive of the main chain for transporting the clamps in such a manner that the perforated metal bands and the chain advance simultaneously and through the same distance.

Advantageously, the first and second perforated endless bands have loop-closure means of thickness smaller than the thickness of an assembly constituted by a folder and its insert, which means are disposed in offset manner on the first and second metal bands so as to be situated in empty gaps between two successive assemblies, each comprising a folder and its insert.

Preferably, the pitch of the perforations in the metal bands is identical to the pitch of the links in the chain fitted with the clamps.

In another particular embodiment, the card manufacturing installation comprises an auxiliary closed-loop chain driven in indexed manner by motor-driven sprocket wheels and fitted with a set of auxiliary clamps mounted at a constant pitch on links of the auxiliary chain, and a main closed-loop chain driven in indexed manner by motor-driven sprocket wheels synchronously with the auxiliary chain and fitted with a set of main clamps mounted at a constant pitch on links of the main chain.

In which case, in an application to an installation for manufacturing cards that enable personalization data to be applied photographically, the auxiliary chain moves successively via a feeder station for supplying photosensitive negative coupons, a photographic station for transferring personalization data onto the photosensitive negative coupons, a developer station for developing the negative coupons by dipping them in an activator bath, and a superposition station for pressing the negative coupons onto respective positive blank coupons supplied by a feeder station for supplying positive blank coupons, and clamp opening/closing means are disposed at least at the negative coupon feeder station and the superposition station for pressing negative coupons against respective positive blank coupons.

The main chain moves successively via at least a feeder station for supplying positive blank coupons, a pre-wetting station, a superposition station for pressing negative coupons against respective positive blank coupons, a transfer and development zone in which the negative coupons are superposed on the positive blank coupons to enable respective images to be transferred from the negative coupons onto the positive blank coupons, a removal station for removing the negative coupons by mechanically peeling them off the positive blank coupons, a washing station for washing the positive coupons by dipping them in a bath of water, a first drying press station, a stabilizing station for dipping the coupons in a stabilizer bath, a second drying press station, and a drier station.

More particularly, the superposition station for pressing negative coupons against respective positive blank coupons comprises a pair of drive gears fitted with spacer cams and secured to transmission shafts of a pair of pressing and transfer cylinders between which a negative coupon superposed on a positive blank coupon are inserted while held by respective clamps driven by the auxiliary chain and the main chain, at least one of spacer cams being provided with an annular positioning slot and a spacer projection.

In another particular embodiment, the station for removing negative coupons by mechanical peeling comprises a set of three motor-driven round belts acting on an edge of each negative coupon that was previously clamped in a clamp of the auxiliary chain and that projects a little from the positive coupon from its side remote from the clamp holding the positive coupon.

The installation of the present invention makes it possible to introduce personalization data both by photography and by printing and also to combine both types of technique on a single manufacturing line.

In a particular embodiment, the card manufacturing installation comprises a print station for printing personalization data on blank coupons by means of a thermal transfer tape supplied transversely relative to the travel direction of the chain transporting the blank coupons, and removed after each blank coupon has been printed, likewise transversely relative to the travel direction of the chain transporting the blank coupons.

The print station for printing personalization data comprises a device for unwinding the thermal transfer tape at constant tension from a reel, which unwinder device itself comprises a friction support acting on the reel or its core, first and second presser cylinders between which the unreeled thermal transfer tape is inserted, at least one torque generator coupled to one of the shafts of the first and second cylinders and connected to a frame of the unwinder device by an antirotation member.

The printer station for printing personalization data comprises a constant-tension winding device, which device has first and second superposed cylinders pulling the thermal transfer tape after it has gone past a print head, at least one torque generator associated with the drive shaft that drives one of the first and second cylinders, and a motor and gear box unit for rotating both the torque generator and a core for receiving the tape to be wound into a reel around said core after it has been pulled by passing between said first and second cylinders.

In a variant embodiment, the printer station for printing personalization data contains a reel storing thermal transfer tape and a reel for receiving thermal transfer tape, the diameters of the reels when full being no greater than about three times their diameters when in the empty state, the storage and reception reels being situated on either side of a print head, a torque generator is coupled directly to the support core of the storage reel and is connected to the support frame of said core via an antirotation member, and a torque generator associated with a drive member is coupled directly to the support core of the reception reel.

The blank coupons can be made of paper or of plastics material. Nevertheless, the blank coupons can also be made in the form of plates that include, where appropriate, electronic circuit elements, such as an integrated circuit and an antenna coil, for example.

The invention also provides a method of manufacturing a run of personalized coupons such as identity cards, the method comprising at least a step of supplying blank coupons to a first work station, a step of personalizing the blank coupons in a second work station, and a step of cutting out personalized coupons in a third work station, the coupons being transported from one work station to another in succession, the method being characterized in that the coupons are transported from one work station to another individually by means of clamps mounted at a constant pitch on links of a chain driven in indexed manner round a closed circuit, and in that each clamped and transported coupon is held along one of its marginal zones, at least in two regions thereof, which regions are spaced apart from each other in the travel direction of the chain, while nevertheless both co-operating with the same clamp.

The step of supplying blank coupons may comprise, level with a clamp brought to a feeder station, transferring and cutting off a segment of strip placed transversely relative to the chain and having a succession of segments constituting blank coupons.

The supply step can also be performed from a stack of pre-cut-out blank coupons.

According to a particular feature of the invention, the step of personalizing a blank coupon comprises unwinding a thermal transfer tape at constant tension from a storage reel and bringing it into register with a print head, transferring personalization data by printing with the print head on a blank coupon superposed with the thermal transfer tape, and removing the thermal transfer tape by pulling it at constant tension prior to winding it onto a reception reel.

In a particular implementation, the method includes a step of laminating a coupon, and prior to the laminating step, each coupon held by a clamp is inserted into a folder constituted by a doubled film assembly made from two segments of plastics material strip fed perpendicularly to the travel direction of the chain and sealed together along a single longitudinal edge thereof, which edge is situated in front of the corresponding coupon in the travel direction of the coupon.

In another particular implementation, the method comprises a step of laminating a coupon, and prior to the laminating step, each coupon held by a clamp is released from the clamp by being cut out and taken hold of by a moving suction cup so as to be transported individually to a laminating station fed with plastics material in the form of top and bottom strips that are inserted parallel to the travel direction of the moving suction cups.

According to yet another feature of the invention, the method of manufacturing identity cards comprises a step of forming and transporting negative coupons each held in a marginal zone at at least two regions thereof that are spaced apart from each other in the travel direction of a closed loop auxiliary chain by means of a clamp transported by the indexed-advance auxiliary chain, a step of forming and transporting positive blank coupons each held in a marginal zone at at least two regions thereof that are spaced apart from each other in the travel direction of the closed loop main chain by means of a clamp transported by the indexed-advance main chain, a step of superposing a negative coupon and a positive blank coupon and of pressing them together, a step of transporting a superposed positive coupon and negative coupon by means of the single clamp transported by the main chain, a step of removing the negative coupon by mechanically unpeeling it, and a step of transporting and treating the positive coupon on its own by means of the clamp transported by the main chain.

BRIEF DESCRIPTION OF THE DRAWINGS

Other characteristics and advantages of the invention appear from the following description of particular embodiments, given as examples, and with reference to the accompanying drawings, in which:

FIG. 3 is an overall view of a clamp mechanism for taking hold of a coupon and serving in the manufacture of a secure identity card;

FIG. 4 is a plan view of an individual clamp for taking hold of a coupon and usable in the mechanism of FIG. 3;

FIG. 5 is a side view of the FIG. 4 clamp;

FIGS. 6A and 6B are views of the clamp of FIGS. 4 and 5 in the travel direction of said clamp, shown respectively in its closed position and in its open position;

FIG. 17 is a diagrammatic view of the drive system for a station for laminating a secure identity card;

FIGS. 18 and 19 are respectively a side view and a plan view of an example of a laminating station that uses the drive system of FIG. 17;

FIG. 20 is a detail view showing the positioning of the zones where the ends of the drive bands of the drive system are joined together to form loops;

DETAILED DESCRIPTION OF PARTICULAR EMBODIMENTS

The invention enables personalized coupons to be made such as identity cards and more particularly secure identity cards such as national identity documents which include personalization data that differs from one card to another in addition to any security elements that may be present on different cards of a given type. The personalization data can comprise information of the alphanumeric type, such as details concerning civil status, and graphics elements such as an identity photograph or a signature.

The personalization data can be stored in a computer file or in a manual file, and is taken therefrom and put onto blank coupons by a printing method or a photographic transfer method in the process of manufacturing identity cards.

The present invention thus makes it possible to personalize blank coupons by means of a printing method, a photographic method, or a combination thereof, with the photographic elements being, for example, transferred onto a blank coupon by a photographic method, while the alphanumeric data is transferred by a printing method.

The installation of the invention is very flexible to implement because of its modular design and its system for conveying coupons individually between the various work stations.

A first example of an installation in accordance with the invention for manufacturing identity cards is described with reference to FIG. 1.

The installation 100 comprises a vertical panel 101 serving as a support for all of the functional elements that define the various work stations of the installation. The vertical panel 101 can itself be mounted on any type of moving or fixed frame. Advantageously, the space situated on one side of the panel 101, e.g. the space situated behind the plane of FIG. 1, can be used for housing various electrical drive and control members, while the space situated in front of the plane of FIG. 1 can be used for housing the various members of the production line through which the coupons pass in order to produce finished or semi-finished products.

Figure 1:
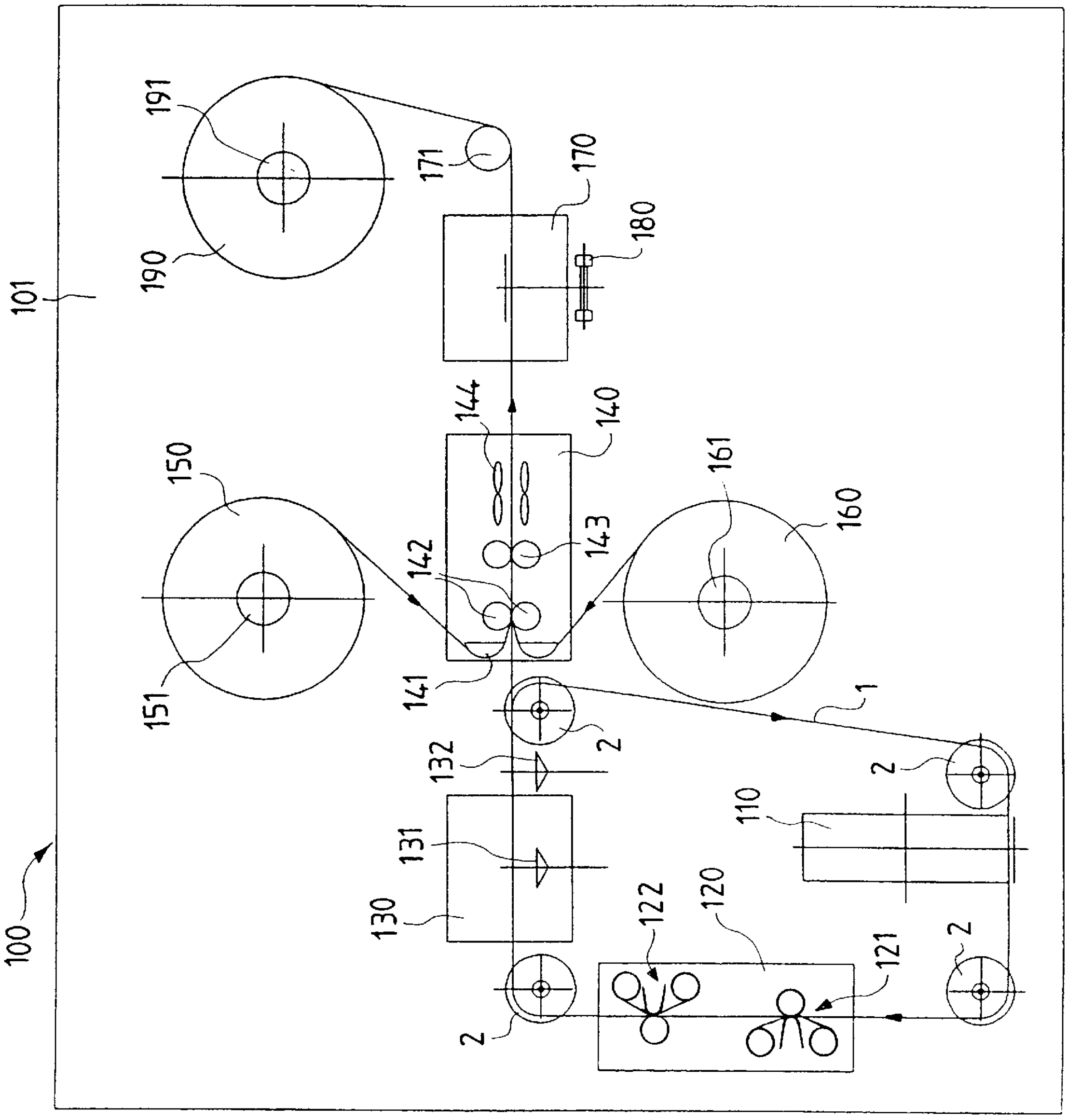
FIG. 1 is a diagrammatic overall view of a first example of an installation of the invention for manufacturing secure identity cards.

The installation of FIG. 1 comprises a carousel having a closed-circuit chain 1 driven by motor-driven sprockets 2 in indexed manner. A plurality of clamps 5, an example of which is described in greater detail below with reference to FIGS. 3 to 5 and 6A, 6B, are mounted at constant pitch on links of the chain 1, and the clamps co-operate with opening/closing means such as 37 (FIG. 3) or 343 (FIG. 21) placed in fixed positions. Each clamp serves to take hold of an individual blank coupon C, to transport the coupon C between work stations, and to release a card as a finished or semi-finished product once the coupon C has been subjected to all of the desired treatments.

In FIG. 1, it can be seen that the chain 1 serves in succession: a feed station 110 for supplying blank coupons $C_1$; a personalization station 120 for personalizing blank coupons $C_1$ and constituted in this example by a recto-verso printing station 121, 122 of the thermal transfer type; and a cutting-out station 130 for cutting out personalized coupons $C_2$. In the cutting-out station 130, a coupon $C_3$ constituting a semi-finished individualized product is picked up by a moving suction cup 131 which transfers the coupon $C_3$ to a work station 140 which, in this example, constitutes a laminating station. The movements of the moving suction cups 131, 132 for taking hold of the cut-out coupons $C_3$ are synchronized with the motion of the chain 1 but take place along a path that is independent of the closed circuit path of the chain 1.

The laminating station 140 is fed with top and bottom strips 152 and 162 of plastics material coming from reels 150 and 160 mounted on cores 151 and 161, with said strips 152 and 162 being inserted parallel to the travel direction of a pre-cut-out personalized coupon $C_3$, on either side thereof, between successive pairs of motor-driven cylinders 142 and 143, and is put under pressure so as to laminate and seal a coupon between top and bottom lengths of strip plastics material 152, 162. Before being inserted between the first pair of cylinders 142, the top and bottom strips 152 and 162 of plastics material are put into contact with heating shoes 141, and after leaving the second pair of cylinders 143, the laminated card C4 comprising a personalized coupon $C_3$ sandwiched between the strips of plastics material $C_4$ is subjected to the action of cooling fans.

Figure 28:
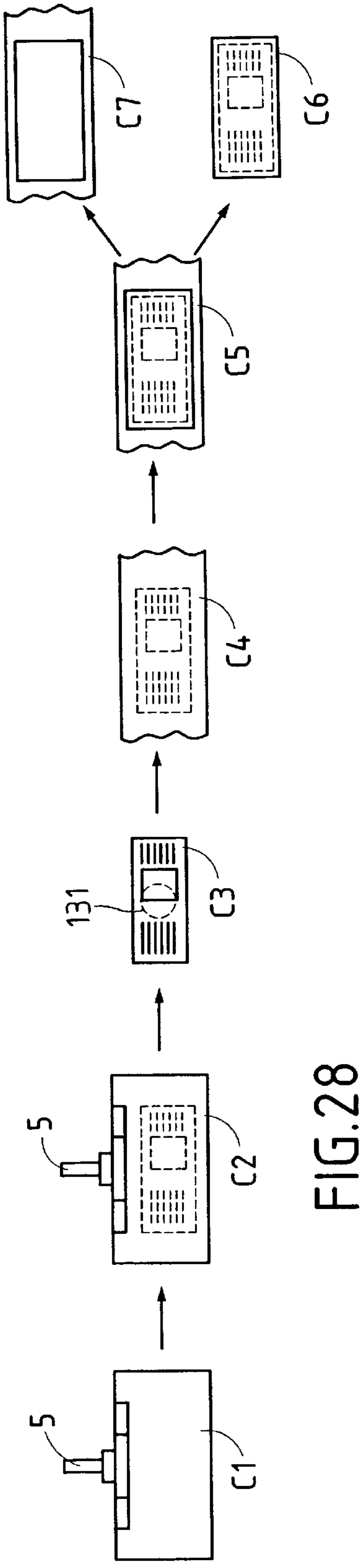
FIG. 28 is a set of views of identity card elements during various stages of manufacture by means of the installation of FIG. 1.

The laminated card $C_5$ comprises the personalized coupon $C_3$ sandwiched between the two strips of plastics material 152 and 162 which are sealed to each other in leakproof manner around the entire periphery of the coupon $C_3$, e.g. in a margin that is 3 mm wide. The card $C_5$ is inserted into a station 170, 180 for cutting out and recovering finished personalized cards $C_3$ which are extracted, while the residual skeleton $C_7$ of strips of plastics material that remains after the finished personalized cards $C_6$ have been cut out therefrom is wound onto a core 191 in a station for forming a reel 190. FIG. 28 shows the successive states of the coupons $C_1$ to $C_6$ between the feed station 110 and the station for recovering finished products.

The installation of FIG. 1 is particularly adapted to blank coupons C being made of paper and in need of being protected by a covering of plastics material that is sealed in leakproof manner around the entire periphery of the personalized and pre-cut-out coupon $C_3$.

Figure 2:
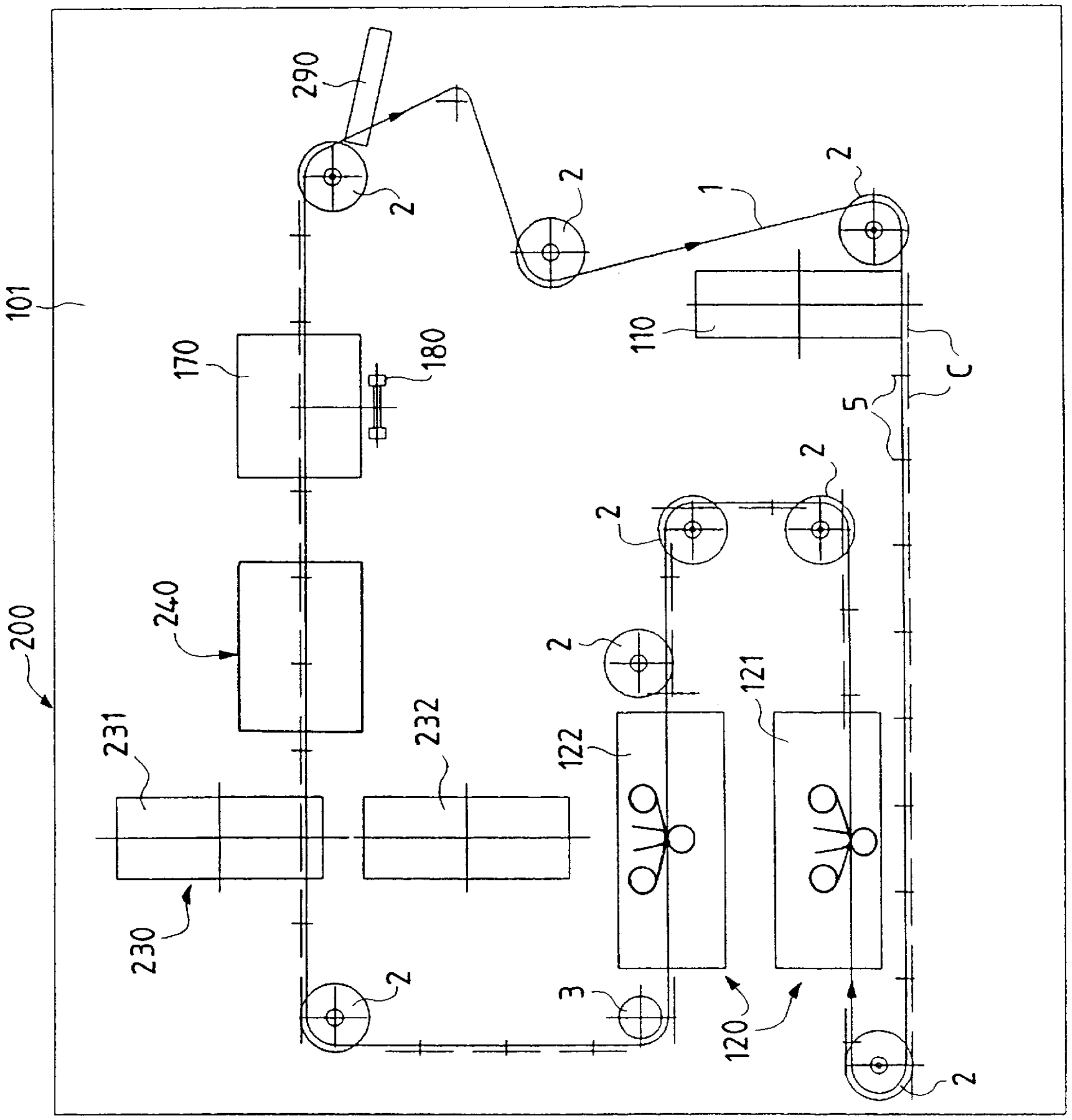
FIG. 2 is a diagrammatic overall view of a second example of an installation of the invention for manufacturing secure identity cards.

FIG. 2 shows another example of an installation 200 in accordance with invention for making identity cards and implementing a closed circuit chain 1 driven in indexed manner by motor-driven sprockets and having a set of clamps 5 mounted at constant pitch on links of the chain 1.

The clamps 5 are mounted at a constant pitch which can correspond, for example, to one clamp for every ten links, and which constitutes the indexing pitch.

In FIG. 2, the various working members can be mounted on a vertical panel 101 in analogous manner to the installation 100 of FIG. 1.

The installation 200 of FIG. 2 comprises a feed station 110 for supplying blank coupons C, a personalization assembly 120 for personalizing blank coupons C and comprising a station 121 for printing on the reverse side of a coupon and a station 122 for printing on the front side of the coupon, a pre-laminating station 123 for bringing the personalized coupon to a laminating station 240 while it continues to be transported by the same clamp 5, a cutting-out station 170 for cutting out a laminated finished card, a conveyor belt 180 for collecting finished cards, and a station 290 for extracting the residual portions of the coupons that result from the cutting-out operation performed in work station 170.

Before describing in greater detail specific examples of the feed station 110, the pre-laminating station 230 of the laminating station 240, and the personalization station 120, a preferred embodiment of a clamp for taking hold of a blank coupon during various stages of the manufacture of a card and for transporting the coupon through the various work stations under drive from the endless chain 21 is described below with reference to FIGS. 4, 5, 6A, and 6B, said chain passing in succession through all of the work stations in the installation 200 of FIG. 2.

Each clamp 5 comprises a pair of jaws 54, 55 for taking hold of the edge of a blank coupon C over essentially the entire length thereof in the travel direction of the chain 1. Upwardly-extending vertical external abutments 52 secured to the bottom jaw 54 ensure that proper positioning of a blank coupon which is held by a clamp 5 over a length L and a width l.

By way of example, the width l of engagement between the jaws 54 and 55 of each clamp 5 lies in the range 3 mm to 5 mm. The length L of engagement between the jaws 54 and 55 can, for example, be 70 mm for a coupon having a dimension of the order of 100 mm in the travel direction of the clamps. The clamps 5 thus hold a coupon C over a length L which constitutes more than half the size of the coupon in the clamp travel direction.

Each clamp 5 has laterally-extending fasteners 51 enabling it to be fixed to the chain 1, e.g. by a quick fastener system. The fasteners 51 are located beneath the plane in which a blank coupon is held by the jaws 54 and 55.

Each clamp 5 can be made of stainless steel, for example, and comprises a central spring 59 disposed between the bottom face of the bottom jaw 54 and a bottom plate 56 which is secured to the top plate 55 by lateral uprights 57. The spring 59 can be held in a central position by a centering stud 53 secured to the bottom face of the bottom jaw 54. The laterally-extending fasteners 51 are connected to the bottom jaw 54 by a link piece 50.

FIG. 6A shows a clamp 5 in the closed position, while FIG. 6B shows a clamp 5 in an open position under drive from a thrust member 37, which includes a spherical head, for example.

In the example described, the clamps 5 are actuated mechanically, but they could equally well be actuated magnetically, electromagnetically, or pneumatically. In particular, the resilient return means for the jaws 54, 55 included in the clamp 5 could be different from the spring 59.

It is important that the length L along which a coupon C is engaged by the jaws 54, 55 constitutes a substantial fraction of the length of the coupon C, and it is essential that the pressure of the jaws 54, 55 is distributed over a marginal zone of a coupon C in at least two regions that are spaced apart from each other in the travel direction of the coupons so as to avoid any deformation of the blank coupons and so as to guarantee that the coupons are held reliably.

The inside bearing faces of the jaws 54, 55 can be provided with a coating that favors grip, e.g. in the form of a set of points distributed over the entire surface thereof and constituted, for example, by diamond powder. In a variant embodiment, the jaws 54, 55 can nevertheless be caused to depart slightly from being flat so that the pressure exerted by the clamp on a coupon being held is slightly stronger at the front and rear ends of the clamp.

By way of example, the clamps 5 can be installed once every ten links of a chain having a pitch of 12.7 mm, i.e. once every 127 mm. The constant pitch of the clamps 5 which corresponds to a constant integer number of links naturally depends on the dimensions of the cards to be made. Installations of the invention for manufacturing cards can typically comprise 20 to 80 clamps, for example. It is thus easy to manufacture small runs of cards quickly. Since the total time required by a clamp to pass through all of the work stations is less than 3 minutes, the waiting time for a card of a new type is very short. Under stabilized production conditions, throughput can be of the order of 1200 cards manufactured per hour.

The clamps 5 can advantageously be provided with sets of code marks, e.g. using a bar code, thereby making it possible for any particular clamp to be tracked accurately through the installation.

FIG. 3 shows an example of a feed station 110 for supplying blank coupons C from a strip of material B rolled in the form of a reel 30 on a core 31. The strip B can be made of paper, of plastic material, or of negative or positive type photosensitive material. The strip B can in particular be constituted by a material that includes a security background.

In FIG. 3, it can be seen that the reel 30 storing the strip B is supported by rollers 32. The support rollers could nevertheless equally well act directly on the core 31 on opposite sides of the reel 30. The strip B coming from the reel 30 is pinched between a pair of superposed cylinders 33 which constitute a motor-driven pulling unit 33. A motor-driven guillotine 34 is disposed between the motor-driven pulling unit 33 and the path of the clamps 5 so as to cut off a segment of strip B to constitute a blank coupon C that is taken hold of by a clamp 5 which is opened by an opening/closing mechanism 36 comprising a pusher head 37 acting on the clamp 5 and secured to a crank-and-connecting rod system 38 driven by a motor 39 controlled synchronously with the advance of the chain 1 and of the clamps 5 so as to enable a clamp 5 to open when it stops temporarily in front of the feed station 110 in order to receive a blank coupon cut off by the guillotine 34 whose action is likewise synchronized with that of the advance of the clamp 5, and takes account of information coming from an optical cell 35, e.g. an optical fiber read cell for monitoring the position relative to a clamp 5 of a blank coupon C to be cut from the strip B.

In some cases, if the strip B already has information on it that is to be located in a determined position on each blank coupon C, a plurality of optical fiber read cells can be used to detect not only one coupon length, but also the locations of printed marks. Under such circumstances, a plurality of cutting operations can be performed, where appropriate.

As mentioned above, once a blank coupon C has been inserted into a clamp 5 and has come into abutment against stops 52, the pusher 37 of the opening mechanism 36 is retracted and the top jaw 55 of the clamp 5 is returned downwards by the spring 59 so as to clamp the coupon C against the bottom jaw 54.

A feed station for supplying blank coupons from a strip of rolled material in the form of a reel 30 is described above with reference to FIG. 3. In a variant, the feed station 110 could equally well comprise a charger containing pre-cut-out blank coupons and unpacking and/or handling means such as suction cups for supplying blank coupons from a charger in a manner that is synchronized with the chain 1 stopping each time a clamp is in register with the feed station 110.

Figure 8:
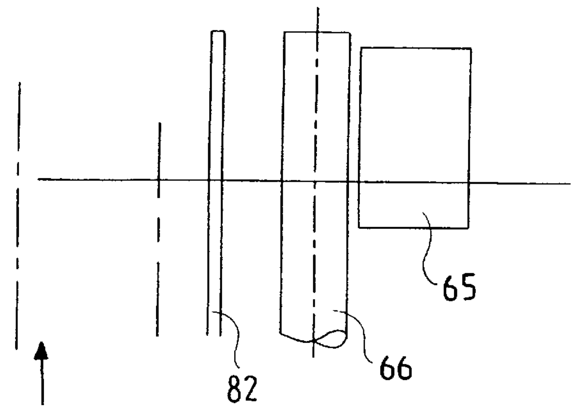
FIG. 8 is a plan view of a portion of the FIG. 7 station.
Figure 7:
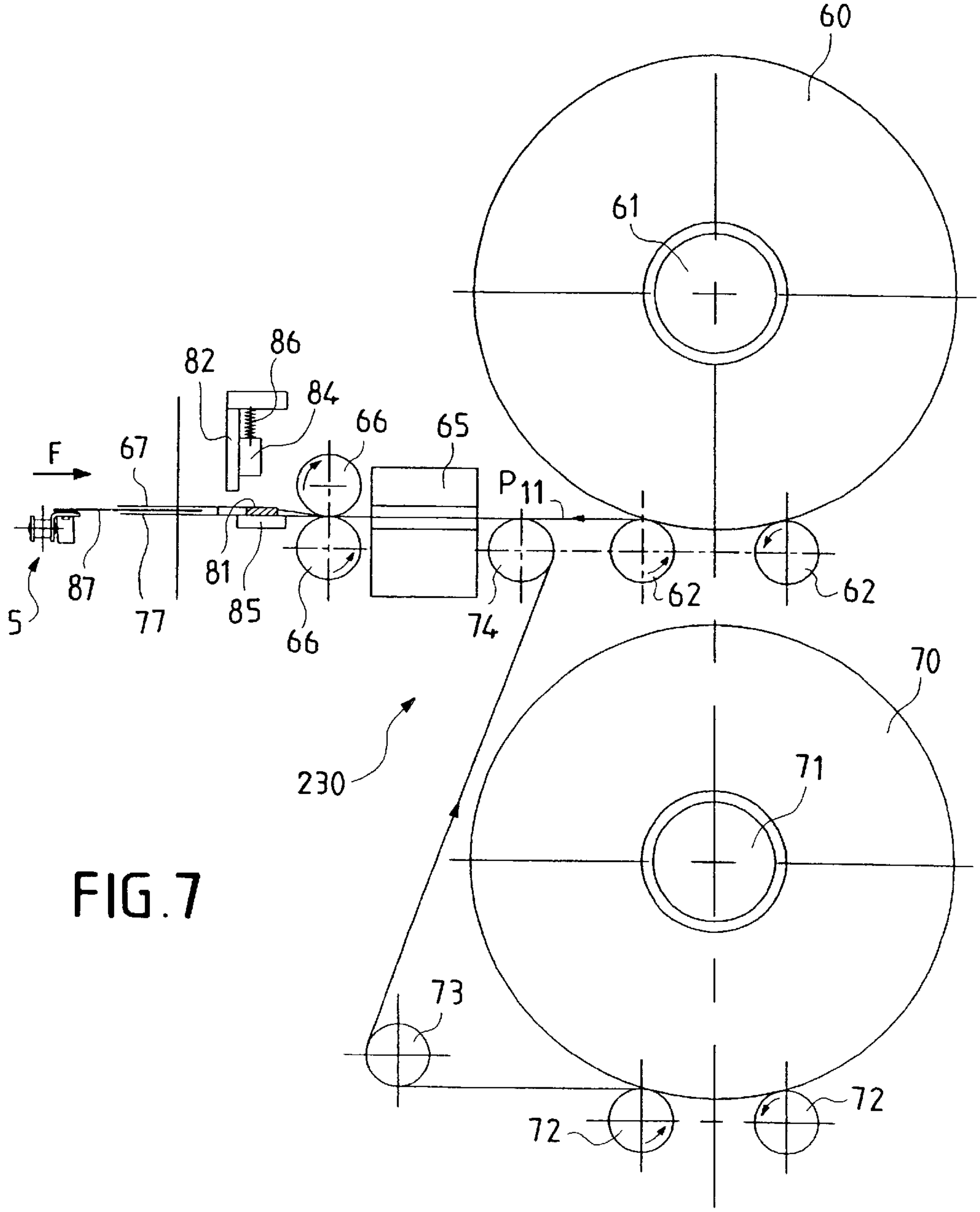
FIG. 7 is an overall view of a station for forming a protective covering of plastic material for a secure identity card.
Figure 9:
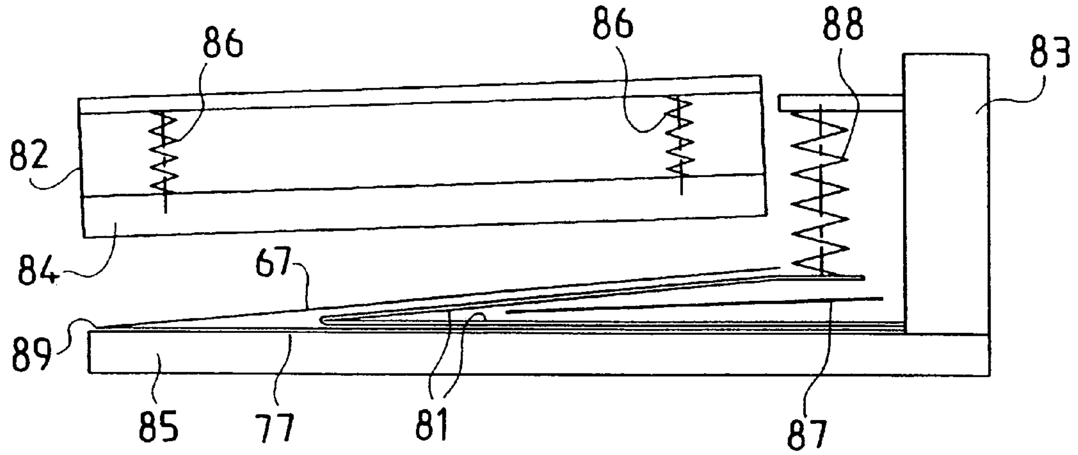
FIG. 9 is a view of a portion of the FIG. 7 station, on a larger scale and as seen looking along arrow F, showing how a protective covering is made.

With reference to FIGS. 7 to 9, there follows a description of one example of the technique for preparing a coupon for a lamination step, which takes place in a work station 230 in FIG. 2 and which is used in particular when the coupon is itself made of plastics material or when problems of sealing the finished laminated card are not critical. This technique of preparing for the laminating step by making a covering or folder in which the personalized coupon is inserted out of two segments of plastics material strip makes it possible to avoid causing the clamps 5 to let go of the assemblies that lead to the production of finished personalized and laminated cards.

The pre-laminating station 230 for preparing a doubled film of plastics material in the form of a folder, comprises top and bottom rolls 60 and 70 feeding strips of plastics material $P_{11}$ and $P_{12}$ perpendicularly to the travel direction of the chain 1 fitted with clamps 5.

The reels 60, 70 wound on cores 61 and 71 are supported by rollers 62 and 72 respectively which in a variant could engage the cores 61 and 71 directly rather than the reels 60 and 70. After being deflected by a roller 73, the bottom strip $P_{12}$ is superposed with the top strip $P_{11}$ at a roller 74. Only one of the longitudinal edges of the superposed strips $P_{11}$ and $P_{12}$ passes over a heating shoe 65 before the superposed strips are pinched and driven together by a pair of motor-driven rollers 66 which serve to seal together the two strips $P_{11}$ and $P_{12}$ along their first longitudinal edges so as to form a doubled film having a top face 67 and a bottom face 77 interconnected via an edge 89. The doubled film 67, 77 is held open by a spacer 81 and defines an empty space into which a coupon 87 held by a clamp 5 can be inserted from behind.

Figure 29:
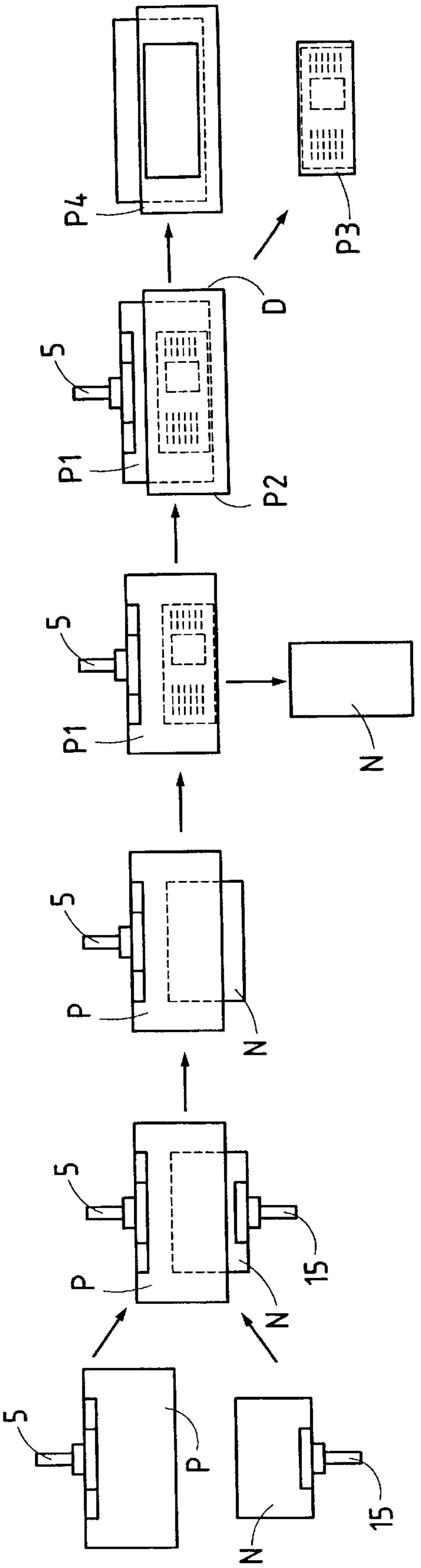
FIG. 29 is a set of views of identity card elements during various stages of manufacture by means of the installation of FIG. 21.

In FIG. 29, there can be seen a coupon $P_1$ held by a clamp 5 and inserted between the two sheets of a film of doubled plastics material $P_2$, with the connecting edge D thereof be situated at the front in the coupon travel direction, such that the drive imparted to the coupon $P_1$ by the clamp 5 secured to the chain 1 under indexed drive also serves to drive the folder or covering $P_2$ enclosing the coupon $P_1$ to a following work station constituted by a laminating station.

The doubled film 67, 77 enclosing the coupon 87 held by the clamp 5 has itself been released from the strips $P_{11}$ and $P_{12}$ by means of a cutting device in the form of a shear acting transversely to the strips $P_{11}$ and $P_{12}$.

The cutting device can comprise a backing blade 85 located beneath the spacer 81, a cutting blade 82 cooperating with the backing blade 85, and a plate 84 cooperating with springs 86 and acting as a film press against the film 67 during the cutting operation. FIG. 9 also shows a spring 88 acting as a return spring for the spacer 81 which is constituted by a V-shaped piece. The backing blade 85 is mounted on a support 83 and provides a space beneath the spacer 81 to allow the film 7 to pass.

With the configuration shown in FIGS. 7 to 9, the top face of the spacer 81 moves down with the shear under drive from the plate 84, thereby avoiding any deformation of the top film 67 relative to the bottom film 77 while the blade 85 is cutting, and making it possible to obtain two cut segments of film 67, 77 having the same dimensions and accurately superposed on each other. The spring 88 enables the top face of the spacer 81 to be lifted between two cutting operations.

The two films of plastics material $P_{11}$, $P_{12}$ are advantageously made of polyester with a layer of polyethylene. When the films $P_{11}$ and $P_{12}$ are superposed, the layers of polyethylene face each other. The heating shoe 65 is regulated so that only the polyethylene is caused to melt, thereby heat-sealing the first longitudinal edges of the two films together as they pass through the cylinders 66.

It will be observed that the coupon 87 can be made of paper or of flexible plastic material, but that it could also be rigid and constituted by any other material suitable for being laminated. In particular, the coupon 87 can be constituted by a rigid or semi-rigid card fitted with an integrated circuit chip, and where appropriate with an antenna coil.

A laminating station 240 is described below with reference to FIGS. 17 and 20, this station being suitable for use after the pre-laminating station 230 as described above.

The laminator 240 essentially comprises two perforated metal bands 528 which are welded together or closed in junction zones 529 (FIG. 20) so as to constitute two endless bands that are driven in indexed manner. The perforated endless bands 528 are driven by four motor-driven cylinders 522, 523 which are disposed in pairs, with two non-opposing cylinders 522 being fitted laterally with sprocket wheels.

The upstream portions of the metal bands 528 are in contact with two regulated heating shoes 541, 542. A pair of laminating cylinders 524, 525 is disposed after the heating shoes 541, 542. Cooling shoes 551, 552 are in contact with the metal bands 528 downstream from the laminating cylinders 524, 525.

The metal bands 528 thus have respective path portions that are parallel, in which they hold at least one card constituted by a folder $P_2$ of plastics material together with its insert held by a clamp 515.

The perforations of the metal bands 528 and the sprocket wheels 522 serve to ensure that the junctions 529 in the endless bands 528 are accurately positioned and thus to ensure that these junctions 529 lie in gaps between cards during the indexed motor-driven motion. It can be observed that if the bands 528 were not perforated and accurately controlled as to positioning by the sprocket wheels 522, then the junctions 529 in the bands 528 would be positioned randomly relative to the cards to be laminated and could thus give rise to lamination which would be faulty due to a mark being left by the junction.

In contrast, in this aspect of the invention, if E designates the pitch between two adjacent clamps 515 for holding cards, the junctions 529 can be situated accurately in the intercard gaps (FIG. 18). The junctions 529 of two endless metal bands 528 are preferably offset relative to each other by a distance d corresponding to one pitch step or to an integer number of pitch steps for the clamps 515 (FIG. 20). The link elements at the junctions 529 must themselves be of a thickness that is less than the thickness of a card (i.e. a folder containing its insert) as driven by a pair of metal bands 528. As a result, the laminated card can be smooth and very plane due to the constant and accurate holding between the two metal bands 528.

The motor-drive of the laminator 240 is linked to the motor-drive of the main chain 1 carrying the clamps 515 such that the chain 1 and the perforated metal bands 528 advance simultaneously and by the same amount. The pitch of the perforations in the bands 528 is advantageously the same as the pitch of the chain carrying the clamps 515.

In FIGS. 18 and 19, there can be seen the support frame 521 of the laminator, the axis 511 of the chain of clamps 515, the plane 516 in which the cards for laminating travel, the clamps 515 for holding the cards, and the springs 532 and the screws 531 that adjust the pressure exerted by the top cylinders 523 relative to the opposing bottom cylinders 523.

FIG. 17 shows the general drive scheme 510 for the laminator 240 which has a chain 501 driven by motor-driven sprocket wheels 502 associated with backing rollers 503 and a deflection roller 504. In FIG. 19, reference 538 also designates one of the gears for driving the laminating cylinders 524, 525. References 526 and 527 of FIG. 18 also designate a spring and a screw for adjusting the pressure exerted via the laminating cylinders 524, 525.

In FIGS. 18 and 19, heating shoes 541, 542 and cooling shoes 551, 552 are shown by way of example having a length that corresponds substantially to that of two coupon lengths, so as to double the length of time these coupons remain in register with the heating and cooling members 541, 542 and 551, 552.

Methods and installations are described above with reference to FIGS. 1 and 2 for manufacturing identity cards in which the cards are personalized in a station 120 essentially by means of a printer enabling the cards to be printed on the front and/or the back with data from files before they are laminated. A method and an installation for manufacturing secure identity cards is described below with reference in particular to FIG. 21 in which some of the personalization data is transferred onto the cards by a photographic type method and other data is transferred onto the cards by a printing method. In order to obtain identity cards of good quality, it is thus essential for the printing step to be performed with care.

Various systems are described below with reference to FIGS. 10 to 16 serving, in particular in a print system of the thermal transfer type, to control the winding-out and the winding-in of a strip from a reel.

In practice, various problems arise when a strip stored as a reel is run off, due to variations in the diameter of the reel as the strip is wound out. This gives rise to variations of tension in the strip which, in general, tend to impede proper operation of equipment using the wound-out strip, such as a printing operation.

Various systems have already been proposed for braking the reel-carrier core, sometimes in association with a regulating pulley block. This leads to relatively complex devices being implemented, serving in particular to measure decrease in reel diameter as it is used up, and responding to the measurement by controlling a brake element that acts on the core of the reel, such as a powder brake or a hysteresis brake. The changing diameter of the reel can be measured by means of a diameter sensor which is either mechanical or which relies on sensing, e.g. using an ultrasound sensor. In order to achieve sufficient reliability, it is necessary to use equipment that is expensive.

In accordance with the present invention, systems are proposed for maintaining constant or quasi-constant tension while unwinding a strip without it being necessary to monitor the diameter of the reel to be run off.

With reference to FIG. 1, there can be seen a reel 401 for storing a tape 407, such as a thermal transfer tape, around a core 402.

A friction support comprising two rollers 403 mounted on a support 404 and resting on a brake plate 405 acts on the reel 401 merely for the purpose of preventing untimely and random unwinding of the reel by inertia. In a variant embodiment, a similar system is applied, not directly to the reel 401, but to the core 402 thereof. The unreeled tape 405 then passes between two cylinders 412, 413 that are pressed against each other by means of a system comprising an adjustment screw 418 and a spring 419 acting on a support frame 411, so that the pressure between the cylinders 412, 413 is necessary and sufficient to enable the cylinders to be caused to roll by applying traction to the strip 407 downstream from the cylinders 412, 413.

Thus, it is the pulled material 407 which drives the outer layers of the cylinders 412, 413. At least one of the cylinders 412, 413 (the cylinder 412) is fitted with a torque generator 415 which is connected to the shaft of the cylinder 412 by a coupling 416 and is connected to the framework 411 by an anti-rotation support.

By implementing the pair of cylinders 412, 413 and at least one torque generator 415, the pulling torque through the cylinders 412, 413 is relatively tiny and the tension in the strip on being unwound is practically zero.

This method of unwinding eliminates problems due to variations in diameter while the reel is being unwound, so there is no need to monitor variation in the diameter.

The effectiveness of the constant strip tension during unwinding is provided by the presence of a torque generator 415 installed on at least one of the shafts of the cylinders 412, 413. Where appropriate, it is possible to install a torque generator on each of the shafts of the cylinders 412, 413 mounted via ball bearings 414 on the frame 411.

The torque generator 415 can be of electromechanical type such as a powder coupler or a hysteresis brake. A torque generator of this type, under a voltage that is adjusted to be constant, delivers an output current that is constant and that determines a constant pulling torque. This type of torque generator can be adjusted by means of a potentiometer in its control circuit, and of a caliber that corresponds to the type of torque generator.

It is also possible to use mechanical torque generators such as speed reducers (at constant torque) or mechanical speed controllers (at variable torque). Although limited in operation because of their speed which cannot greatly exceed the speed given by the gear ratio, such mechanical type apparatuses present advantages of simplicity of installation and low cost price compared with electromechanical systems.

It is also possible to combine implementation of a mechanical type torque generator with an electromagnetic type torque generator, thereby making it possible to use smaller apparatuses in each range, which are therefore less expensive.

A torque generator can also be integrated inside the cylinder 412 or two torque generators can be integrated inside the two cylinders 412 and 413.

In any event, in order to obtain constant tension in the strip, a pair of cylinders 412, 413 fitted with at least one torque generator 415 is installed on the path of the strip material 407. The coating of the cylinders 412, 413 is determined by the nature of the material to be unwound. The diameter of the cylinders 412, 413 is determined by the traction force to be obtained for the constant tension and by the torque given by the generator 415.

Figure 12:
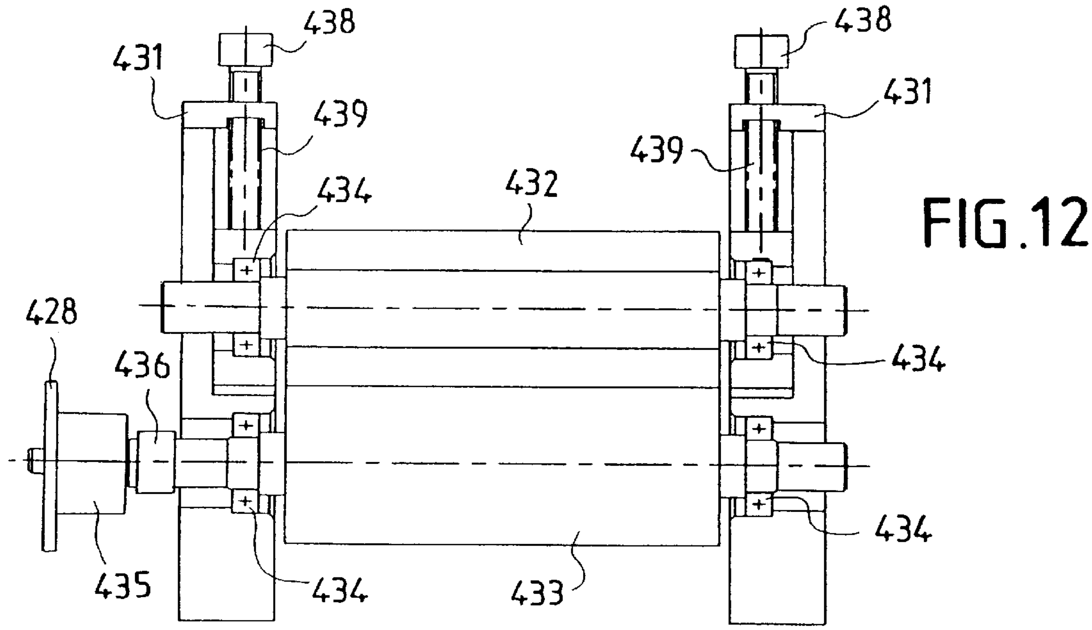
FIG. 12 is a view in the winding-in direction of a strip of material showing a device for maintaining constant tension.
Figure 13:
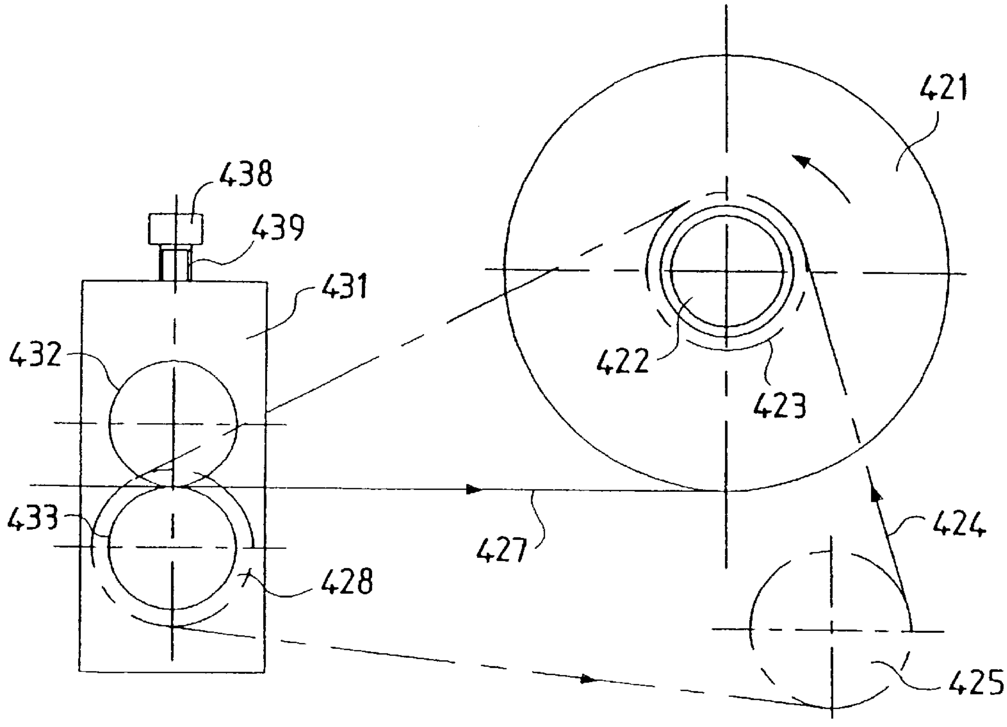
FIG. 13 is a side view of the FIG. 12 device.

FIGS. 12 and 13 show a similar principle being used for winding a strip material 427 onto a take-up core 422 in order to form a reel 421, with winding being obtained at constant tension.

In this case, the core 422 of the reel 421 is driven by a motor and gear box unit 425, e.g. by friction via a belt 424. The strip 427 to be wound passes through a pair of cylinders 432, 433 mounted in a frame 431 in a manner analogous to the cylinders 412, 413 of the unwinding device shown in FIGS. 10 and 11. The shafts of the cylinders 423, 433 are thus mounted via ball bearings 434 in the frame 431, and adjustment screws 438 associated with springs 439 enable the pressure exerted by the cylinder 423 against the cylinder 433 to be adjusted. The torque generator 435 is connected via a coupling 436 to the shaft of the cylinder 433.

Unlike the unwinding device, there is no antirotation device, but on the contrary the torque generator 433 is itself set into rotation, e.g. by means of a pulley 428, by the motor unit 425 acting via the belt 434.

The reel 421 is thus rotated by transmission derived from a single motor unit 425, as is the torque generator 435.

The drive criteria remain the same as for unwinding a reel. Nevertheless, in FIGS. 12 and 13 it is feeding the winding torque of the generator that gives rise to slip.

Figure 10:
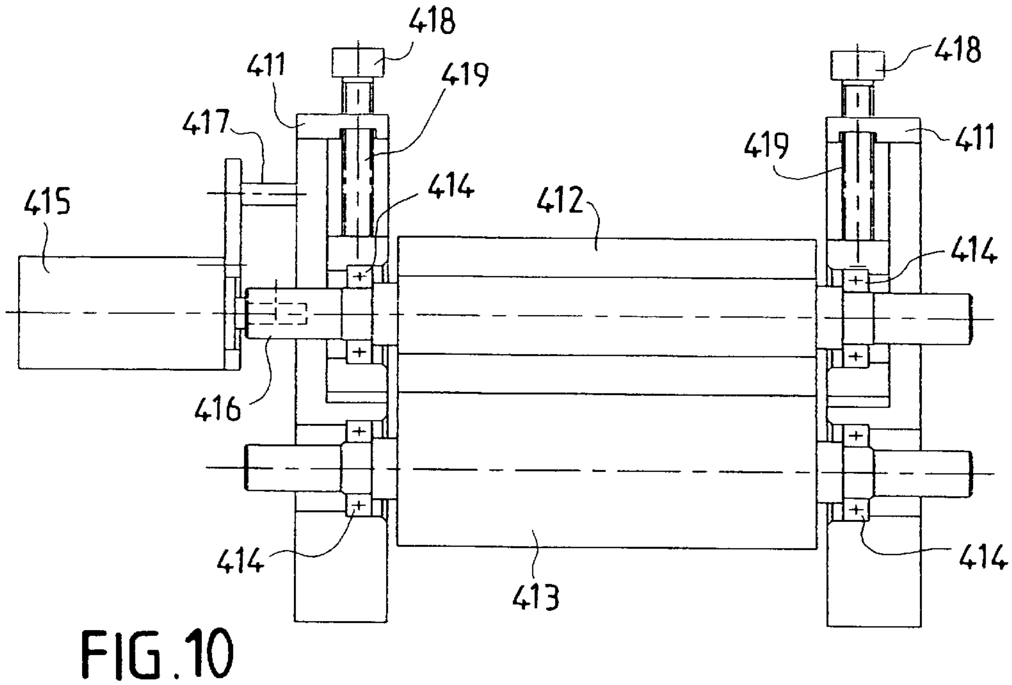
FIG. 10 is a view in the winding-out direction of a strip of material showing a device for maintaining constant tension.
Figure 11:
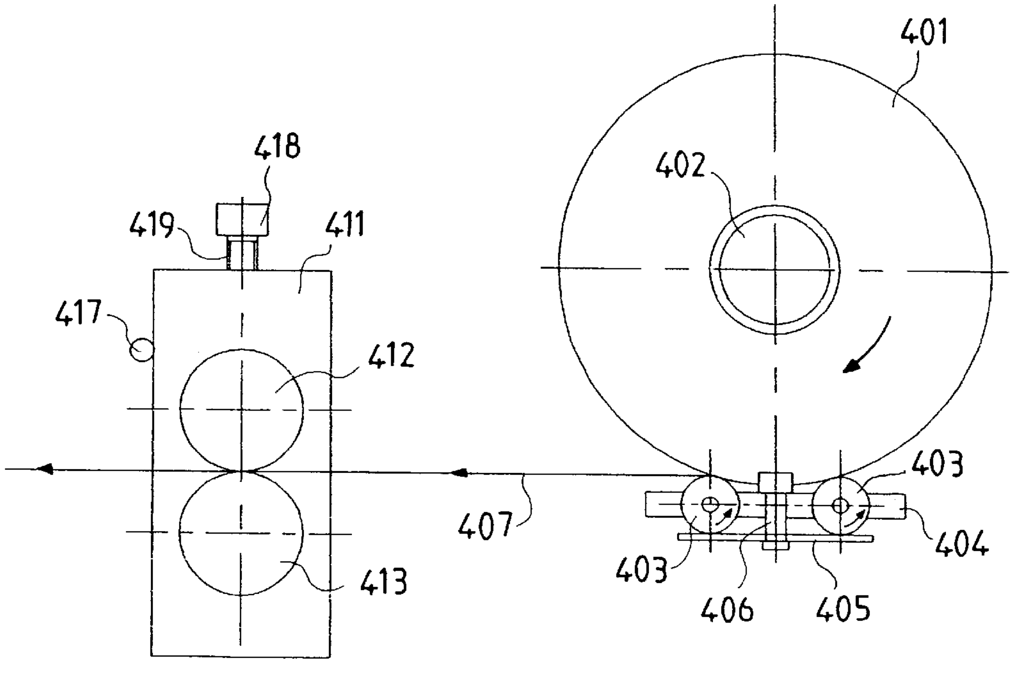
FIG. 11 is a side view of the FIG. 10 device.

The type of torque generator 435 shown in FIG. 12 can be selected using the same criteria as the torque generator 415 of FIG. 10.

Figure 16:
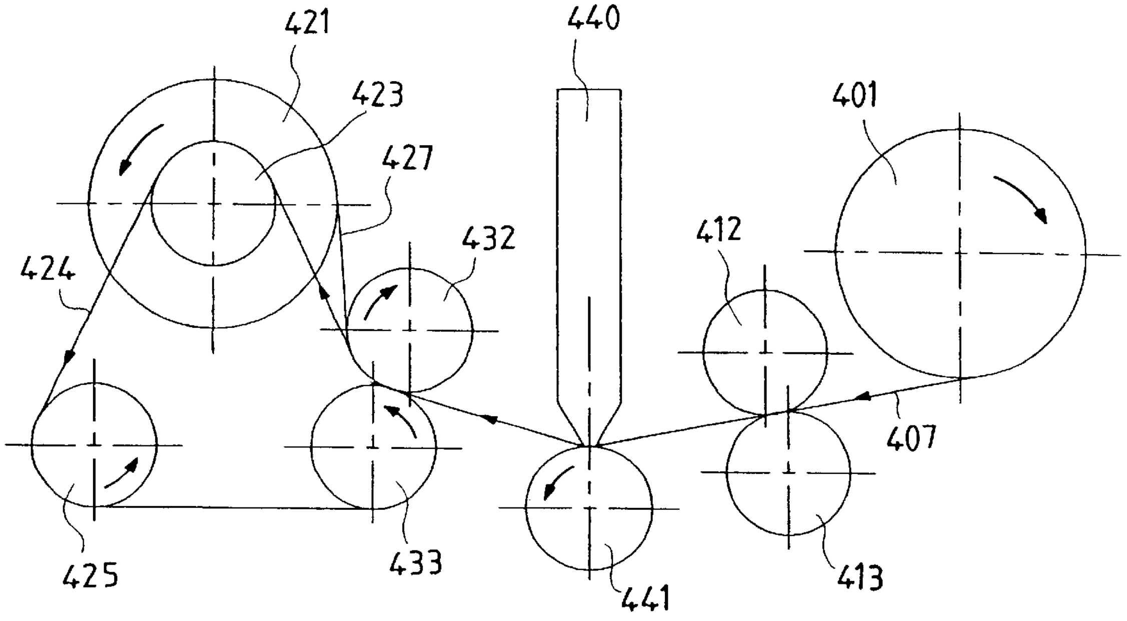
FIG. 16 is a side view of an embodiment of a constant tension device for a strip of material on a printer having large reels.

By way of example, FIG. 16 is a diagram showing a printer having a print head 440 acting on a print tape having an upstream portion 407 unwound from a reel 401 so as to be passed over a backing roll 441 in front of the print head 440, and a downstream portion 427 which, after passing in front of the print head 440, is wound onto a reel 421. In the embodiment shown in FIG. 16, the upstream and downstream strip segments 407 and 427 are kept under tension by a combination of the devices described above with reference to FIGS. 10 to 13. For simplification purposes, FIG. 16 shows only the pair of rollers 412, 413 of the unwinding device and only the pair of rollers 432, 433 of the winding device as associated with the motor unit 425 and a transmission belt 428 co-operating with a portion 423 secured to the core of the reel 421, however the shaft of at least one of the rollers 412, 413 and the shaft of at least one of the rollers 432, 433 is naturally coupled to a torque generator as described above.

The device of FIG. 16 is adapted to the case where the reels 401 and 402 can have a very great difference in diameter between full reels and empty reels.

In some cases, particularly when using small-diameter reels 401' and 421', i.e. when the full reels 401', 421' have a diameter (e.g. 60 mm) which is no more than about two or three times the diameter of the empty reels (e.g. 30 mm or 20 mm), it is possible to use a simplified unwinding device (FIGS. 14 and 15) which contributes to reducing variations in tension in the segments 407', 427' of the print tape situated upstream and downstream from the print head 440', while using a mechanism that is less complex than the mechanism shown in FIGS. 10 to 13 and FIG. 16.

In this case, the print tape passes between the print head 440' and a backing roller 441' in the same manner as in the device shown in FIG. 16, but the pairs of rollers 412, 413 and 432, 433 of FIG. 16 are omitted. The torque generators 415' and 435' associated with the unwinding device and with the winding device are then installed directly on the respective cores 402' and 422' of the reels 401' and 421' which are mounted via ball bearings 414' and 434' on the support frame 411'.

Adjacent to the unwinding device, the torque generator 415' is connected by a coupling 416' to the shaft 402' and has an antirotation member 417' cooperating with the frame 411'.

Adjacent to the winding device, the torque generator 435' is connected by a coupling 436' to the shaft 422' and further comprises a pulley 423' enabling drive to be transmitted via a belt 424' and a pulley 428' driven by a motor unit 425' which also contributes to driving the shaft of the backing roller 441' which is mounted on the support frame 411' by means of ball bearings 434'.

Figure 15:
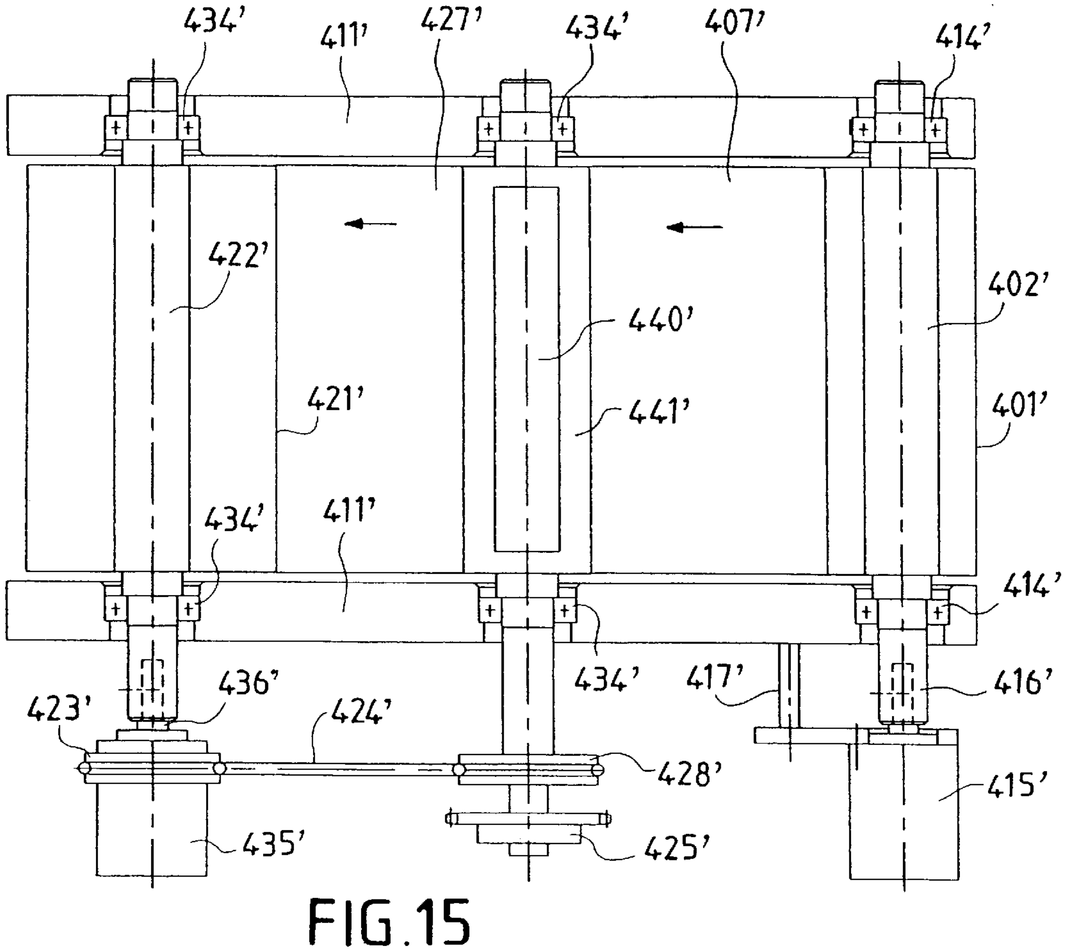

In the embodiments of FIGS. 10, 12, and 15, the torque generators are shown as being outside the shafts of the cylinders or reels with which they co-operate.

In a variant, the torque generators could be incorporated inside the shafts of the cylinders or reels concerned.

There follows a description with reference to FIGS. 21 to 27 of another example of an installation for manufacturing personalized coupons such as identity cards which makes it possible in particular to implement a plurality of different methods for personalizing the cards, such as a printing method and a photographic reproduction method, while nevertheless conserving the advantages of an installation that is compact and capable of producing even limited runs of cards quickly without delay and without long lengths of strips of consumable materials being discarded.

Figure 21:
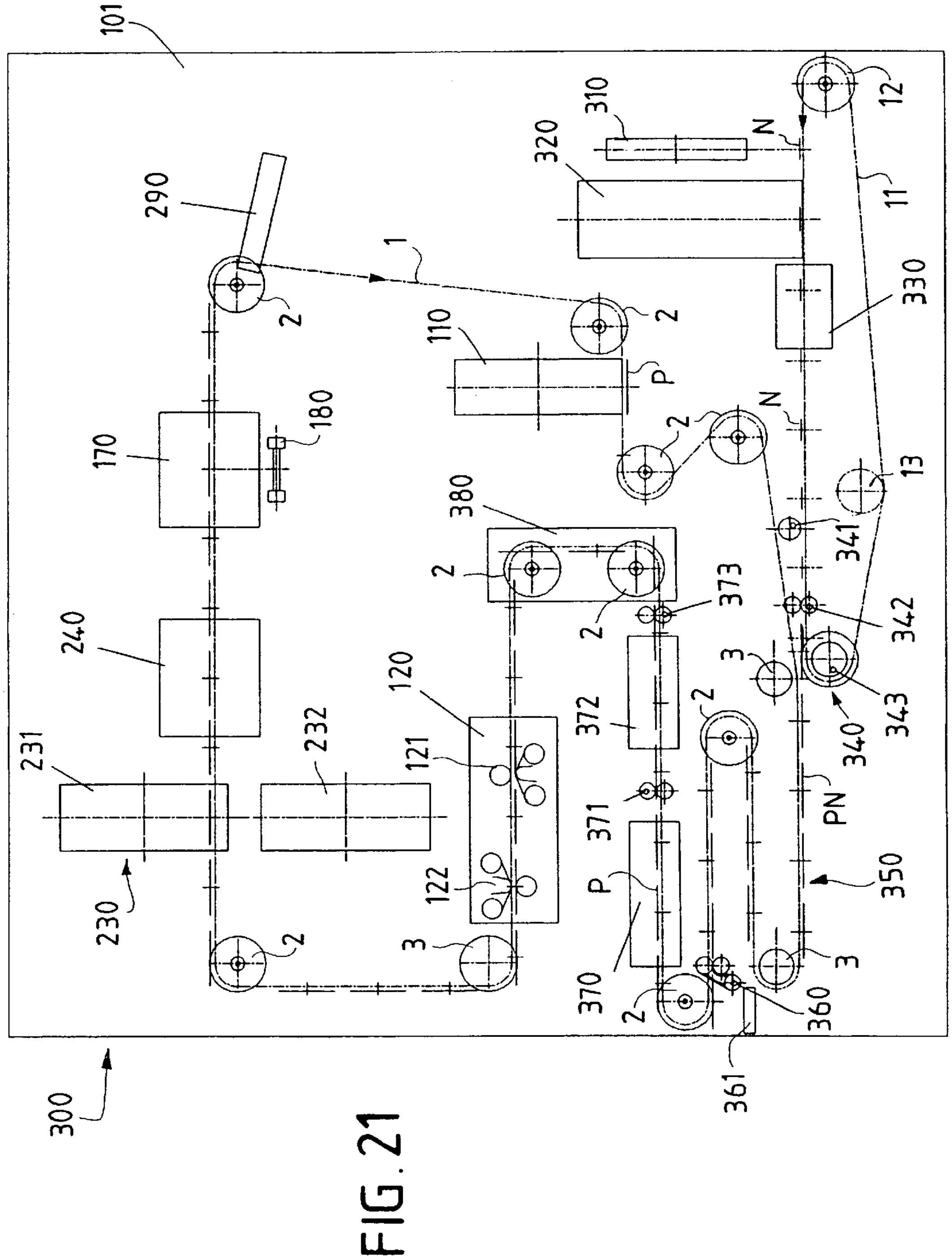
FIG. 21 is a diagrammatic overall view of a third example of an installation of the invention for manufacturing secure identity cards, and implementing a method of reproduction by transfer.

The installation 300 of FIG. 21 is remarkable specifically in that it has an auxiliary closed loop chain 11 driven in indexed manner by motor-driven sprocket wheels 12 and fitted with a set of auxiliary clamps 15 mounted at constant pitch on links of the auxiliary chain 11. The auxiliary clamps 15 can be of a configuration that is entirely analogous to the clamps 5 described with reference to FIGS. 4, 5, and 6A, 6B. However, the length L of the jaws of the clamps 15 can be different from that of the jaws of the clamps 5 mounted on the main chain 1. The length L of the jaws of the clamps 5 and 15 needs to be adapted to the size of the coupons that the clamps are to hold.

The main closed loop chain 1 fitted with a set of main clamps 5 mounted at constant pitch on links of the main chain 1 is analogous to that described above with reference to FIGS. 1 and 2. Motor-driven sprocket wheels 2 drive the main chain 1 in indexed manner, synchronously with the auxiliary chain 11.

By way of example, the auxiliary chain 11 is used in the installation described to transport coupons N constituted by photosensitive elements such as pieces of film or of negative paper, and is constituted by a roller chain fitted with twenty clamps 15 mounted at regular intervals of 127 mm corresponding to a constant pitch of ten chain links at a pitch of 12.7 mm.

In the installation described, the main chain 1 is for transporting positive coupons P made of paper or plastics material onto which personalized information is to be transferred, in particular from negative coupons N, and it can be constituted by a roller chain having sixty clamps 5 mounted at regular intervals of 127 mm corresponding to a constant pitch of ten links for a chain having a pitch of 12.7 mm. It is naturally possible to modify these values as a function of the intended application, and in particular as a function of the coupons and of the number of work stations, providing indexed and synchronized advance at constant pitch with temporary stops is maintained to allow the coupons to be processed in the various work stations. It will be observed that when making cards having a format of about 10 cm×10 cm, an installation using two chains 1, 11 and a set of work stations as described below with reference to FIG. 21 can have a single overall motor unit of relatively low power, e.g. 0.18 kW, said unit being constituted by a motor and gear box unit plus an indexer. The cost of running a machine such as the installation 300 from a single electricity source can be small, corresponding to electricity consumption that does not exceed 2 kWh to 3 kWh.

The rate at which cards are produced can be about 1200 cards per hour, for example, using a compact installation 300 with all of its various work station members mounted on a common frame 101, e.g. constituted essentially by a vertical sheet having a thickness of about 15 mm and length and height of about 1800 mm. The frame 101 is thus compact and, where appropriate, can be mounted on a moving structure enabling the machine 300 to be displaced easily.

As described below, even when implementing a plurality of closed circuits for transporting cards and when implementing a photographic method of personalizing cards, the resulting manufacturing installation 300 is moderate in its own manufacturing cost (because of the moderate cost of its component elements and the ease with which they can be integrated), is of limited size, and provides a manufacturing cost per card that is small even when the installation is adapted to producing several successive small runs of cards of different types. In particular, by using a manufacturing method that acts on segments of strip, a change in production can easily be achieved without it being necessary to completely use up the reels of consumable strip materials (negative film for negative coupons N, paper or plastic material for positive coupons P, films of plastics material for lamination, thermal print tapes, . . . ), thus leading to a lack of waste with said strips of consumable materials.

In the example of FIG. 21, the auxiliary chain fitted with the clamps 15 moves past a feeder station 310 for supplying photosensitive negative coupons N, which station can be of a structure that is analogous to that of the feeder station 110 described above with reference to FIG. 1, enabling individual negative coupons N to be taken by respective clamps 15. The auxiliary chain 11 then passes through a photographic station 320 for transferring personalization data, in particular graphics data such as an identity photograph, onto the photosensitive negative coupon N, from information available in a database. After the negative coupon N has been sensitized in the photographic station 320, the negative coupon N, still transported by a clamp 15 secured to a link of the auxiliary chain 11, is brought to a developing station 330 where the negative coupon N is developed by being dipped into a bath of activator or developer. It will be observed that the length of the developer station 330 is adapted to the time required for developing the negative coupon N. Thus, if necessary, the developer station 330 can extend over a plurality of advance steps of the auxiliary chain 11 so as to keep the negative coupon N in contact with the bath of activator during a plurality of successive advance steps of the clamps 15.

The auxiliary chain 11 then passes a superposition station 342 where the negative coupon N is superposed with pressure against a positive blank coupon P fed from a feeder station 110 for feeding positive blank coupons P from which the positive blank coupons are taken by clamps 5 mounted on the main chain 1.

The main chain 1 itself moves in succession via the feeder station 110 for supplying it with positive blank coupons P (which can be implemented as described above with reference to FIG. 3, but which could equally well comprise a charger of pre-cut-out blank coupons), the. superposition station 342 for pressing a negative coupon N against a positive blank coupon P (this is described below in greater detail with reference to FIGS. 22 to 24), a station 434 for automatically opening the clamp 15 transporting a negative coupon N so as to release this negative coupon N superposed on a positive coupon P, and a transfer and development zone 350 in which the negative coupon N is held in position by capillary adhesion on the positive coupon P which is itself being transported by a clamp 5 of the main chain 1 so that a photographic image is transferred from the negative coupon N onto the positive coupon P. The chain 1 then reaches a station 360 for removing the negative coupon N by mechanically peeling said negative coupon N off the positive coupon P and for discarding the negative coupon N in a tray 361. The main chain 1 then passes a station 370 for washing the positive coupon P by dipping it in a bath of water, a first drying press station 371 where the coupon is wrung dry between a pair of motor-driven cylinders, a stabilizing station 372 where the coupon is dipped in a bath of stabilizer, a second drying press station 373 between a pair of motor-driven cylinders, and a drier station 380 e.g. in the form of a ventilated heating tunnel. The positive coupon P personalized by the presence of a photographic image which may occupy only a limited area of the positive coupon P, e.g. suitable for receiving an identity photograph, or which may have all of the alphanumeric and graphical information required for personalization, can then be treated in a manner analogous to that described above with reference to FIG. 2.

By way of example, FIG. 21 shows a print station 120 having a first printer device 121 for printing on the front face of a coupon P and a second printer device 122 for printing on the rear face of a coupon P, a station 230 for forming a covering of plastics material from supplies 231, 232 of top and bottom strips of plastics material, a laminating station 240, a cutting-out station 170 for cutting out cards, a conveyor belt 180 for receiving finished cards, optionally associated with a stacker, and a bin 190 for receiving the cut-out skeleton constituted by the remains of coupons P after cutting-out in the cutting station 170, with the clamp 5 holding the skeleton being caused to open automatically in front of the bin 290 so as to release the skeleton. This automatic clamp-opening means can be implemented merely by the outline of a rotating cylinder which lifts the bottom plate 56 of the clamp, e.g. at a sprocket wheel that deflects the chain 1 so as to return it towards the first work station 110.

FIG. 21 shows more specifically a particular example of such an outline for a rotating cylinder 343 acting on a clamp 15 of the secondary chain 11 at a sprocket wheel for said chain where it is deflected towards a sprocket wheel 13 for guiding return of the chain to the work station 310. The peripheral portion of the cylinder 343 rotating synchronously with advance of the chain 11 acts on a clamp 15 to open it after the step of superposing the negative coupon N on the positive coupon P so as to allow a single clamp 5 of the main chain 1 to drive the positive coupon P with the negative coupon N superposed thereon and projecting laterally a small distance therefrom.

In FIG. 21, reference 341 designates a roller for coating the rear face of the positive coupon P in an activator substance, e.g. taken from a tank used for wetting the negative coupon N in the developer station 330. The wetting device 341 is situated immediately upstream from the station 342 where the chains 1 and 11 become adjacent to allow a positive coupon P and a negative coupon N to be superposed.

FIG. 29 shows a negative coupon N being superposed on a receiving positive coupon P, followed by the negative coupon N being released by the clamp 15, the negative coupon N remaining superposed on the positive coupon P with only the portion previously held by the clamp 15 projecting laterally therefrom. Thereafter, FIG. 29 shows the negative coupon N being separated after the photographic image has been transferred to the positive coupon $P_1$, and then a folder $P_2$ of plastics material being combined with a personalized positive coupon $P_1$ for a laminating operation prior to a card $P_3$ being cut out therefrom, and the residual skeleton $P_4$ being discarded.

It will be observed that the cost of film suitable for constituting the negative coupons N is generally higher than the cost of materials suitable for constituting positive coupons P. It is thus possible to use negative coupons N of smaller size, corresponding to the dimensions required for reproducing a photographic image such as an identity photograph, with photographic transfer being used to reproduce said identity photograph on a positive coupon so that it occupies only a fraction of the surface area of the positive coupon P, and with the remaining personalization of the positive coupon P on its portions that are not occupied by the photograph being performed solely by print means in a station such as the station 120 which can be constituted, for example, by a thermal type printer or by an ink jet printer.

Figure 22:
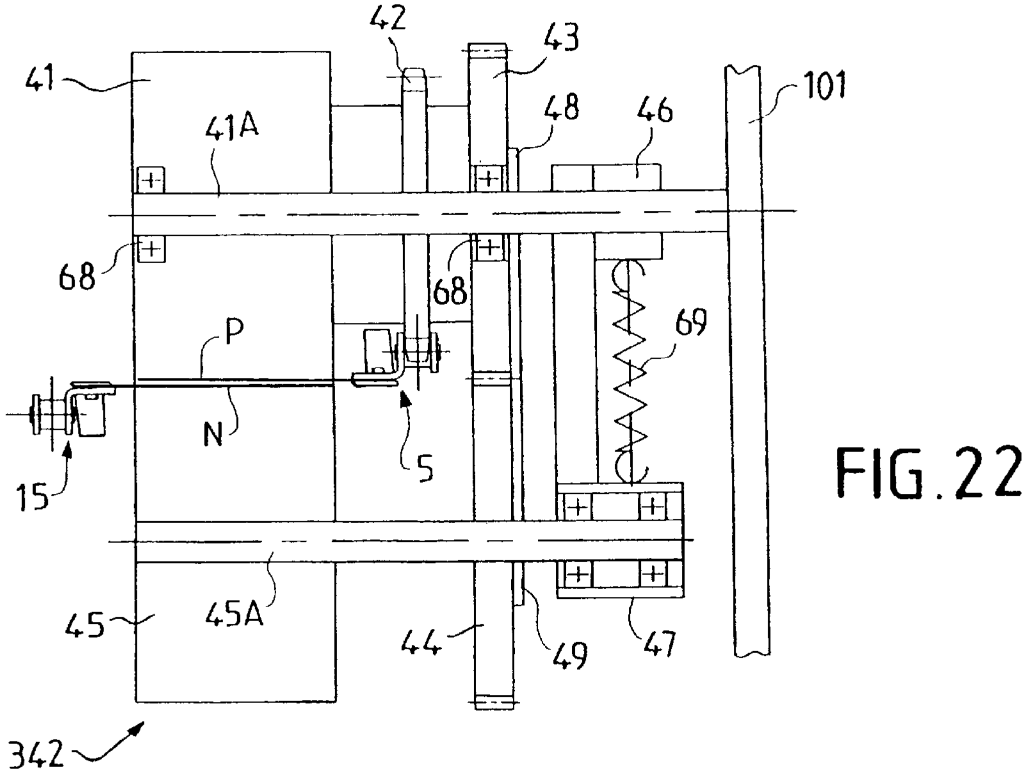
FIG. 22 is a view in the coupon travel direction of a station for performing a transfer from a negative coupon onto a positive coupon in the installation of FIG. 21.
Figure 23:
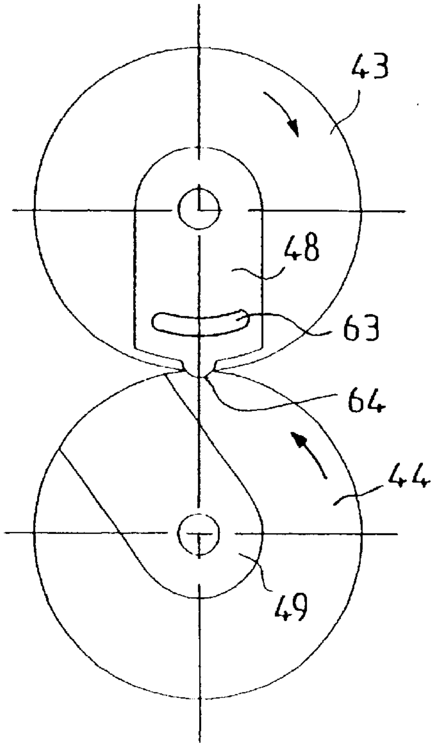
FIG. 23 is a face view of spacer cams mounted on drive gearing in the FIG. 22 transfer station.
Figure 24:
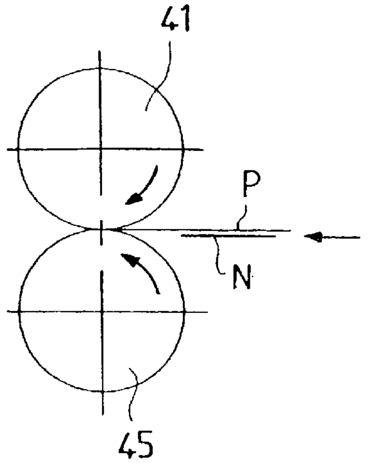
FIG. 24 is a side view of pressing and transfer cylinders used in the transfer station of FIG. 22.

FIGS. 22 to 24 shows an example of a superposition station 324 for pressing a negative coupon N held by a clamp 15 on the auxiliary chain 11 against a positive coupon P held by a clamp 5 of the main chain 1 which has a driving sprocket wheel 42. This superposition station essentially comprises two superposed pressing and transfer cylinders 41, 45 mounted on respective shafts 41A, 45A.

The shaft 45A is mounted on a ball bearing box 47 that is urged by a tension spring 69 towards the support 46 of the shaft 41A which is secured to the frame 101 of the machine. The cylinder 41 secured to the sprocket wheel 42 provides driving engagement via a gear 43 which rotates about the fixed shaft 41A on which the cylinder 41 and the gear 43 are mounted via ball bearings 68. The cylinder 45 is itself rotated by its shaft 45A which is secured to a driving gear 44 that meshes with the gear 43.

The pressure exerted between the two cylinders 41, 45 by the spring 69 is quite large and can cause the negative coupon N to be slightly out of position on the positive coupon P. To remedy that, the pressing cylinders 41 and 45 are moved slightly apart when a negative coupon N is inserted therebetween so as to leave a gap of thickness approximately equal to the thickness of the negative coupon N. This opening is achieved for example by implementing cams 48 and 49 mounted on the drive gears 43 and 44, at least one of which has a projection 64 (FIG. 23) for moving them apart. A slot 63 is formed in the cam 48 to enable angular position to be adjusted. The cycle ratio of the drive gears 43 and 44 serves to synchronize opening of the rollers 41, 45 with the arrival of a negative coupon N.

Figure 14:
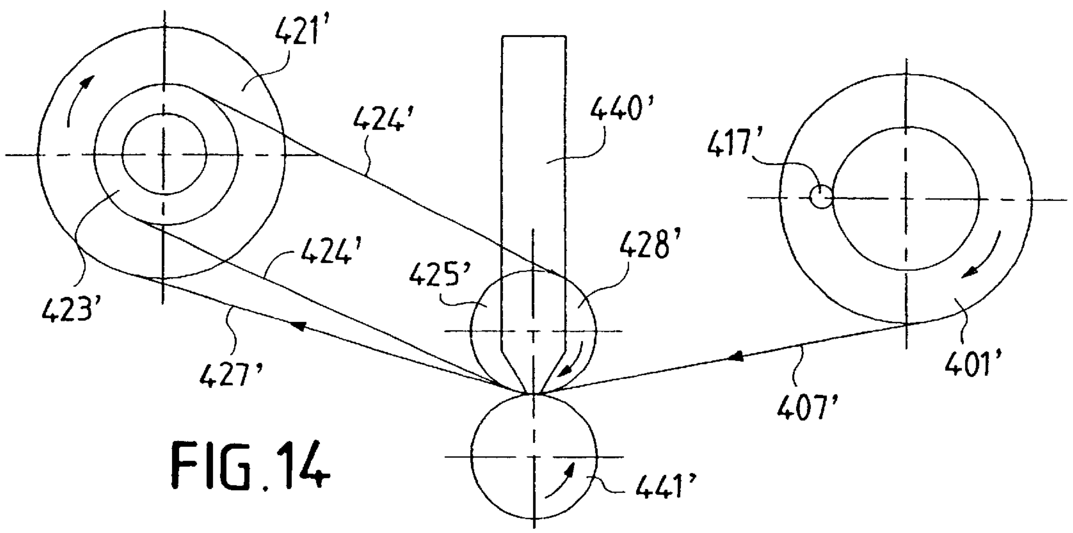
FIGS. 14 and 15 are a side view and a plan view of a variant of the device for winding-out and winding-in a strip of material at constant tension on a printer having small-diameter reels.

It will be observed that an analogous device could be used at a printer, for example of the kind shown in FIGS. 14, 15, and 16, so as to allow a blank coupon to be inserted under the print head 440, 440' which presses a thermal print tape against the blank coupon moving over a backing roller 441, 441'.

After a negative coupon N and a positive coupon P have been superposed in the work station 342, and after the clamp 15 for transporting the negative coupon N has been opened by action of the rotary cam 343, the negative coupon N transported by the positive coupon P gives rise in the zone 350 to the phenomenon of development by transfer of the photographic image from the negative coupon N to the positive coupon P by the method known as diffusion transfer reversal (DTR).

Given the way such transfer develops, it is appropriate to keep the surfaces of the negative and positive in contact on a rectilinear path that is not less than some minimum length. Because the assembly constituted by a positive coupon P supporting a negative coupon N is held by a clamp 5, it is possible for a zigzag path to be given to the main chain 1 to provide a plurality of superposed rectilinear chain segments (FIG. 21), thereby reducing the continuous rectilinear distance that would otherwise be necessary if the negative film had been superposed continuously on a continuous strip of positive material.

Figure 25:
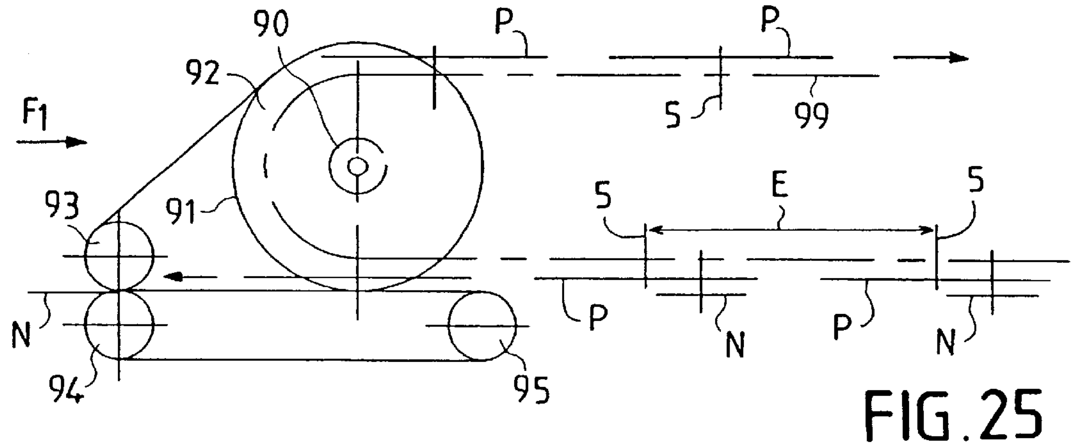
FIG. 25 is a side view showing a negative coupon being separated from a positive coupon after an operation of reproduction by transfer in the FIG. 21 installation.
Figure 26:
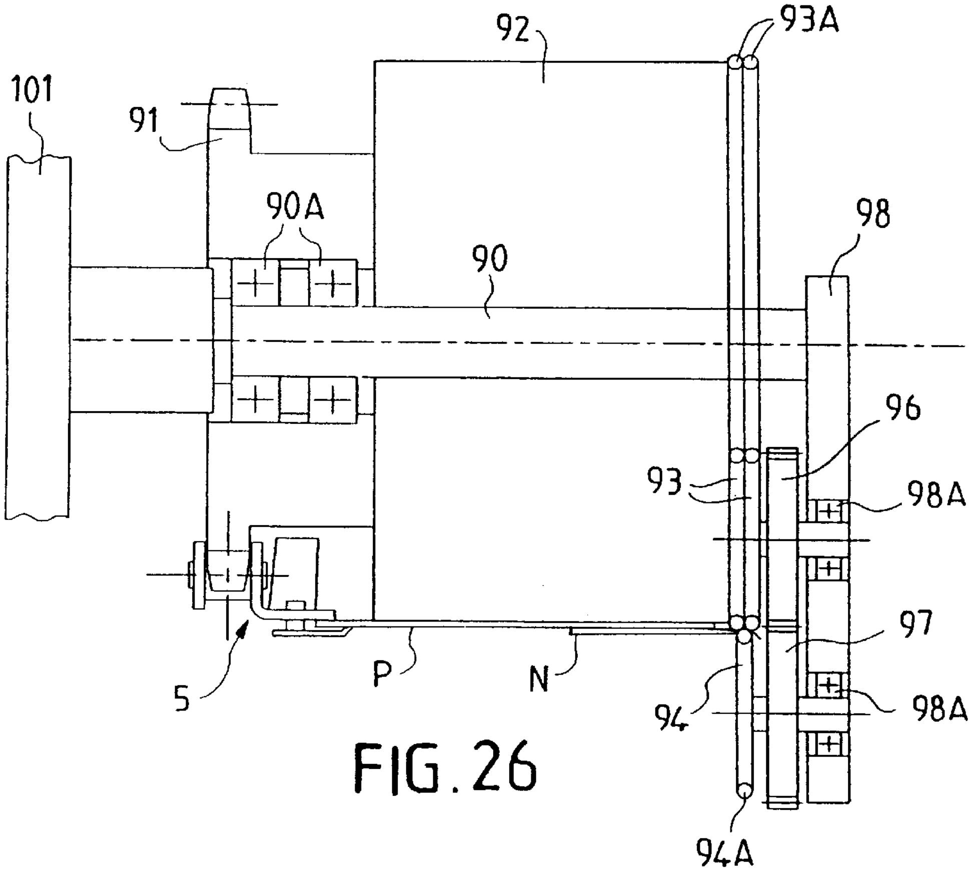
FIG. 26 is a view along arrow $F_1$ of FIG. 25 showing the superposition of the negative and positive coupons.
Figure 27:
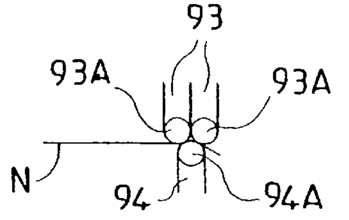
FIG. 27 is a detail view showing how a negative coupon is clamped while it is being separated from a positive coupon.

At the end of transfer development, the negative coupon N can be mechanically peeled off in the station 360 for example in the manner illustrated in FIGS. 25 to 27 using a set of three small motor-drive belts 93A, 94A of circular section acting on the edge of the negative coupon N that was previously held in a clamp 15 of the auxiliary chain 11 and that projects slightly from the positive coupon P from its side remote from the clamp 5 which is holding the positive coupon P.

FIG. 25 shows the path 99 followed by the links of the main chain 1 supporting positive coupons P. A sprocket 91 for driving the chain 1 provides drive for a pulley 92 which is mounted by means of ball bearings 90A on a shaft 90 secured to the frame 101 of the machine. The pulley 92 has two adjacent grooves presenting a diameter corresponding to the diameter of the primitive circle of the clamps 5 as they travel round the sprocket wheel 91. The shaft 90 carries a plate 98 on its side opposite from the frame 101, which plate has fixed thereon (via ball bearings 98A) a small two-groove pulley 93 and two small one-groove pulleys: an upstream pulley 95 and a downstream pulley 94. A pair of gears 96, 97 on the same axes as the small pulleys 93, 94 serve to drive the small pulley 94 from the motion of the small pulley 93 which is itself driven by the main pulley 92 of large diameter. The various pulleys 92, 93, 94, and 95 have grooves that receive belts 93A and 94A, each of which is of circular section, having a diameter that can be about 3 mm, for example. As can be seen in FIG. 27, the edge of the negative coupon N is clamped effectively without sliding between the two top round belts 93A engaged on the pulleys 92 and 93 and the bottom round belt 94A engaged on the pulleys 94 and 95. The negative coupon is then removed automatically by being clamped between the three belts 93A, 94A while the positive coupon P which is set back from the pulleys 92, 93, 94, and 95 continues to follow its path with the clamp 5 along the chain 1.

In installations of the invention for manufacturing identity cards, the clamps 5 and 15 for holding coupons or assemblies C, P, or N and used in the card manufacturing process can be provided with individual codes, e.g. bar codes, which make it possible at all times to read the code on each clamp in the various work stations and thus to situate within the machine any card that is being manufactured. In particular, reading the code of a clamp 5, 15 in a personalization station 120, 320 makes it possible during production to monitor the application of personal identity data and makes it possible to avoid errors even when the various sets of personalization data (e.g. transferring an identity photograph, printing on the front and the back of a card) are applied to a card in different work stations 320, 121, 122 from different data files.

What is claimed is:

1. An installation for manufacturing personalized coupons, the installation comprising a set of work stations with at least a feed station for supplying blank coupons (C, P), a personalization station for personalizing blank coupons (C, P), and a cutting-out station for cutting out personalized coupons (C, P), with a system for transporting coupons (C, P) between the various work stations, the installation being characterized in that the system for transporting coupons (C, P) comprises a carousel having at least one chain driven in indexed manner by motor-driven sprocket wheels, and a set of clamps mounted at a constant pitch on links of the chain and co-operating with opening/closing means placed in fixed positions, so that each clamp takes hold of an individual blank coupon (C, P), transports said coupon (C, P) between the various work stations, and releases the coupon (C, P) in a station for collecting the finished or semi-finished product, each clamp having a pair of jaws for clamping a marginal zone of a blank coupon (C, P) in at least two regions thereof which are spaced apart from each other in the travel direction of the chain, and having external abutments secured to one or other of the jaws for laterally positioning the blank coupon (C, P) held between said jaws.

2. An installation according to claim 1, characterized in that each clamp has lateral fastenings fastening it to the chain, the fastenings being located below the plane in which a coupon (C, P) is held by the jaws.

3. An installation according to claim 2, characterized in that:

each clamp has a central spring disposed between the bottom face of the bottom jaw and a bottom plate secured to the top jaw;

each clamp has vertical external abutments extending upwards and secured to the bottom jaw;

the width (l) of engagement between the jaws of each clamp lies in the range 3 mm to 5 mm;

the clamp opening/closing means comprises a mechanical pusher secured to a mechanism of the crank and connecting rod type or an outline of a rotating cylinder; and the feeder station for supplying blank coupons (C, P) comprises a transfer and cutting station for transferring to a clamp a segment of a strip (B) disposed transversely relative to the chain, the strip having a succession of segments constituting blank coupons (C, P).

4. An installation according to claim 1, characterized in that each clamp has a central spring disposed between the bottom face of the bottom jaw and a bottom plate secured to the top jaw.

5. An installation according to claim 1, characterized in that each clamp has vertical external abutments extending upwards and secured to the bottom jaw.

6. An installation according to claim 1, characterized in that the width (l) of engagement between the jaws of each clamp lies in the range 3 mm to 5 mm.

7. An installation according to claim 1, characterized in that the clamp opening/closing means comprises a mechanical pusher secured to a mechanism of the crank and connecting rod type.

8. An installation according to claim 1, characterized in that the clamp opening/closing means comprise an outline of a rotating cylinder.

9. An installation according to claim 1, characterized in that the feeder station for supplying blank coupons (C, P) comprises a transfer and cutting station for transferring to a clamp a segment of a strip (B) disposed transversely relative to the chain, the strip having a succession. of segments constituting blank coupons (C, P).

10. An installation according to claim 9, characterized in that the feeder station has support means for supporting a storage reel of said strip (B), a pair of superposed cylinders between which the strip (B) coming from the reel is pinched and which constitute a motor-driven pulling unit, a motor-driven guillotine disposed between the motor-driven puller unit and the path of the clamps, and an optical cell for monitoring the arrival of clamps in register with blank coupons (C, P) to be cut off by the guillotine from segments of strip (B) and to be held by the clamp actuated by clamp opening/closing means disposed in the vicinity of the feeder station and synchronized with the indexed advance of the chain.

11. An installation according to claim 1, characterized in that it has code marks on each clamp and in that it has at least one station for personalizing the coupons (C, P) constituted by a station for individualized printing of at least one face of the coupons (C, P) transported by said clamps.

12. An installation according to claim 1, characterized in that it comprises a pre-laminating station with top and bottom rolls for supplying strips of plastics material ($P_{11}$, $P_{12}$) perpendicularly to the travel direction of the chain to form a folder ($P_2$) that encloses an insert constituted by a pre-cut-out personalized coupon ($P_1$) held by a clamp, and a laminating station acting on the assembly constituted by said folder ($P_2$) and its insert held by a clamp.

13. An installation according to claim 12, characterized in that the pre-laminating station comprises a device for feeding two strips of plastics material ($P_{11}$, $P_{12}$) with only a first longitudinal edge of each of the strips ($P_{11}$, $P_{12}$) passing via a heating shoe prior to the two strips ($P_{11}$, $P_{12}$) being driven through a pair of motor-driven rollers which seal the two strips ($P_{11}$, $P_{12}$) together via their first longitudinal edges so as to form a double film that is held open by a spacer prior to receiving said insert and constituting a folder ($P_2$) after being cut by a device for cutting the double film transversely so as to form a sandwich driven towards a laminating station by the central insert held by a clamp.

14. An installation according to claim 13, characterized in that:

each of the strips of plastics material ($P_{11}$, $P_{12}$) is constituted by a film of a base material provided with a coating layer compatible with the insert and favoring heat-sealing, and in that the top and bottom strips of plastics material ($P_{11}$, $P_{12}$) have their coating layers facing each other; and that it comprises a laminating station having first and second perforated metal bands welded to form endless loops and motor-driven by a set of four cylinders of which two non-opposing cylinders are fitted laterally with sprocket wheels, the first and second metal bands presenting respective parallel path portions in which they hold at least one assembly constituted by said folder ($P_2$) and its insert held by a clamp, said parallel path portions passing successively via heating shoes, a pair of laminating cylinders, and cooling means.

15. An installation according to claim 14, characterized in that the blank coupons (C, P) are made of paper or of plastics material.

16. An installation according to claim 14, characterized in that the blank coupons (C, P) are in the form of plates.

17. An installation according to claim 12, characterized in that each of the strips of plastics material ($P_{11}$, $P_{12}$) is constituted by a film of a base material provided with a coating layer compatible with the insert and favoring heat-sealing, and in that the top and bottom strips of plastics material ($P_{11}$, $P_{12}$) have their coating layers facing each other.

18. An installation according to claim 12, characterized in that it comprises a laminating station having first and second perforated metal bands welded to form endless loops and motor-driven by a set of four cylinders of which two non-opposing cylinders are fitted laterally with sprocket wheels, the first and second metal bands presenting respective parallel path portions in which they hold at least one assembly constituted by said folder ($P_2$) and its insert held by a clamp, said parallel path portions passing successively via heating shoes, a pair of laminating cylinders, and cooling means.

19. An installation according to claim 18, characterized in that the drive members of the laminating station are synchronized with the indexed drive of the main chain for transporting the clamps in such a manner that the perforated metal bands and the chain advance simultaneously and through the same distance.

20. An installation according to claim 19, characterized in that the first and second perforated endless bands have loop-closure means of thickness smaller than the thickness of an assembly constituted by a folder ($P_2$) and its insert, which means are disposed in offset manner on the first and second metal bands so as to be situated in empty gaps between two successive assemblies, each comprising a folder ($P_2$) and its insert.

21. An installation according to claim 19, characterized in that the pitch of the perforations in the metal bands is identical to the pitch of the links in the chain fitted with the clamps.

22. An installation according to claim 1, characterized in that it comprises an auxiliary closed-loop chain driven in indexed manner by motor-driven sprocket wheels and fitted with a set of auxiliary clamps mounted at a constant pitch on links of the auxiliary chain, and a main closed-loop chain driven in indexed manner by motor-driven sprocket wheels synchronously with the auxiliary chain and fitted with a set of main clamps mounted at a constant pitch on links of the main chain.

23. An installation according to claim 22, characterized in that the auxiliary chain moves successively via a feeder station for supplying photosensitive negative coupons (N), a photographic station for transferring personalization data onto the photosensitive negative coupons (N), a developer station for developing the negative coupons (N) by dipping them in an activator bath, and a superposition station for pressing the negative coupons (N) onto respective positive blank coupons (P) supplied by a feeder station for supplying positive blank coupons (P), and in that clamp opening/closing means are disposed at least at the negative coupon feeder station and the superposition station for pressing a negative coupons (N) against respective positive blank coupons (P).

24. An installation according to claim 23, characterized in that the main chain moves successively via at least a feeder station for supplying positive blank coupons (P), a pre-wetting station, a superposition station for pressing negative coupons (N) against respective positive blank coupons (P), a transfer and development zone in which the negative coupons (N) are superposed on the positive blank coupons (P) to enable respective images to be transferred from the negative coupons (N) onto the positive blank coupons (P), a removal station for removing the negative coupons (N) by mechanically peeling them off the positive blank coupons (P), a washing station for washing the positive coupons (P) by dipping them in a bath of water, a first drying press station, a stabilizing station for dipping the coupons in a stabilizer bath, a second drying press station, and a drier station.

25. An installation according to claim 20, characterized in that:

the pitch of the perforations in the metal bands is identical to the pitch of the links in the chain fitted with the clamps; and it comprises an auxiliary closed-loop chain driven in indexed manner by motor-driven sprocket wheels and fitted with a set of auxiliary clamps mounted at a constant pitch on links of the auxiliary chain, and a main closed-loop chain driven in indexed manner by motor-driven sprocket wheels synchronously with the auxiliary chain and fitted with a set of main clamps mounted at a constant pitch on links of the main chain.

26. An installation according to claim 25, characterized in that the blank coupons (C, P) are made of paper or of plastics material.

27. An installation according to claim 25, characterized in that the blank coupons (C, P) are in the form of plates.

28. An installation according to claim 24, characterized in that:

the superposition station for pressing negative coupons (N) against respective positive blank coupons (P) comprises a pair of drive gears fitted with spacer cams and secured to transmission shafts of a pair of pressing and transfer cylinders between which a negative coupon (N) superposed on a positive blank coupon (P) are inserted while held by respective clamps driven by the auxiliary chain and the main chain, at least one of spacer cams being provided with an annular positioning slot and a spacer projection;

the station for removing negative coupons (N) by mechanical peeling comprises a set of three motor-driven round belts acting on an edge of each negative coupon (N) that was previously clamped in a clamp of the auxiliary chain and that projects a little from the positive coupon (P) from its side remote from the clamp holding the positive coupon (P);

it comprises a print station for printing personalization data on blank coupons by means of a thermal transfer tape supplied transversely relative to the travel direction of the chain transporting the blank coupons, and removed after each blank coupon has been printed, likewise transversely relative to the travel direction of the chain transporting the blank coupons;

the print station for printing personalization data comprises a device for unwinding the thermal transfer tape at constant tension from a reel, which unwinder device itself comprises a friction support acting on the reel or its core, first and second presser cylinders between which the unreeled thermal transfer tape is inserted, at least one torque generator coupled to one of the shafts of the first and second cylinders and connected to a frame of the unwinder device by an antirotation member; and the printer station for printing personalization data comprises a constant-tension winding device, which device has first and second superposed cylinders pulling the thermal transfer tape after it has gone past a print head, at least one torque generator associated with the drive shaft that drives one of the first and second cylinders, and a motor and gear box unit for rotating both the torque generator and a core for receiving the tape to be wound into a reel around said core after it has been pulled by passing between said first and second cylinders.

29. An installation according to claim 28, characterized in that the blank coupons (C, P) are made of paper or of plastics material.

30. An installation according to claim 28, characterized in that the blank coupons (C, P) are in the form of plates.

31. An installation according to claim 25, characterized in that the superposition station for pressing negative coupons (N) against respective positive blank coupons (P) comprises a pair of drive gears fitted with spacer cams and secured to transmission shafts of a pair of pressing and transfer cylinders between which a negative coupon (N) superposed on a positive blank coupon (P) are inserted while held by respective clamps driven by the auxiliary chain and the main chain, at least one of spacer cams being provided with an annular positioning slot and a spacer projection.

32. An installation according to claim 26, characterized in that the station for removing negative coupons (N) by mechanical peeling comprises a set of three motor-driven round belts acting on an edge of each negative coupon (N) that was previously clamped in a clamp of the auxiliary chain and that projects a little from the positive coupon (P) from its side remote from the clamp holding the positive coupon (P).

33. An installation according to claim 1, characterized in that it comprises a print station for printing personalization data on blank coupons by means of a thermal transfer tape supplied transversely relative to the travel direction of the chain transporting the blank coupons, and removed after each blank coupon has been printed, likewise transversely relative to the travel direction of the chain transporting the blank coupons.

34. An installation according to claim 33, characterized in that the print station for printing personalization data comprises a device for unwinding the thermal transfer tape at constant tension from a reel, which unwinder device itself comprises a friction support acting on the reel or its core, first and second presser cylinders between which the unreeled thermal transfer tape is inserted, at least one torque generator coupled to one of the shafts of the first and second cylinders and connected to a frame of the unwinder device by an antirotation member.

35. An installation according to claim 33, characterized in that the printer station for printing personalization data comprises a constant-tension winding device, which device has first and second superposed cylinders pulling the thermal transfer tape after it has gone past a print head, at least one torque generator associated with the drive shaft that drives one of the first and second cylinders, and a motor and gear box unit for rotating both the torque generator and a core for receiving the tape to be wound into a reel around said core after it has been pulled by passing between said first and second cylinders.

36. An installation according to claim 33, characterized in that the printer station for printing personalization data contains a reel storing thermal transfer tape and a reel for receiving thermal transfer tape, the diameters of the reels when full being no greater than about three times their diameters when in the empty state, the storage and reception reels being situated on either side of a print head, in that a torque generator is coupled directly to the support core of the storage reel and is connected to the support frame of said core via an antirotation member, and in that a torque generator associated with a drive member is coupled directly to the support core of the reception reel.

37. An installation according to claim 1, characterized in that the blank coupons (C, P) are made of paper or of plastics material.

38. An installation according to claim 1, characterized in that the blank coupons (C, P) are in the form of plates.

39. A method of manufacturing a run of personalized coupons, the method comprising at least a step of supplying blank coupons (C, P) to a first work station, a step of personalizing the blank coupons (C, P) in a second work station, and a step of cutting out personalized coupons (C, P) in a third work station, the coupons being transported from one work station to another in succession, the method being characterized in that the coupons (C, P) are transported from one work station to another individually by means of clamps mounted at a constant pitch on links of a chain driven in indexed manner round a closed circuit, and in that each clamped and transported coupon (C, P) is held along one of its marginal zones, at least in two regions thereof which regions are spaced apart from each other in the travel direction of the chain, while nevertheless both co-operating with the same clamp.

40. A method according to claim 39, characterized in that the step of supplying blank coupons (C, P) comprises, in alignment with a clamp brought to a feeder station, transferring and cutting off a segment of strip (B) placed transversely relative to the chain and having a succession of segments constituting blank coupons (C, P).

41. A method according to claim 30, characterized in that:

the step of personalizing a blank coupon (C, P) comprises unwinding a thermal transfer tape at constant tension from a storage reel and bringing it into register with a print head, transferring personalization data by printing with the print head on a blank coupon (C, P) superposed with the thermal transfer tape, and removing the thermal transfer tape by pulling it at constant tension prior to winding it onto a reception reel;

it includes a step of laminating a coupon (C, P) and in that prior to the laminating step, each coupon (C, P) held by a clamp is inserted into a folder constituted by a doubled film assembly made from two segments of plastics material strip ($P_{11}$, $P_{12}$) fed perpendicularly to the travel direction of the chain and sealed together along a single longitudinal edge thereof, which edge is situated in front of the corresponding coupon (C, P) in the travel direction of the coupon; and it includes a step of forming and transporting negative coupons (N) each held in a marginal zone at at least two regions thereof that are spaced apart from each other in the travel direction of a closed loop auxiliary chain by means of a clamp transported by the indexed-advance auxiliary chain, a step of forming and transporting positive blank coupons (P) each held in a marginal zone at at least two regions thereof that are spaced apart from each other in the travel direction of the closed loop main chain by means of a clamp transported by the indexed-advance main chain, a step of superposing a negative coupon (N) and a positive blank coupon (P) and of pressing them together, a step of transporting a superposed positive coupon (P) and negative coupon (N) by means of the single clamp transported by the main chain, a step of removing the negative coupon (N) by mechanically unpeeling it, and a step of transporting and treating the positive coupon (P) on its own by means of the clamp transported by the main chain.

42. A method according to claim 39, characterized in that the step of personalizing a blank coupon (C, P) comprises unwinding a thermal transfer tape at constant tension from a storage reel and bringing it into register with a print head, transferring personalization data by printing with the print head on a blank coupon (C, P) superposed with the thermal transfer tape, and removing the thermal transfer tape by pulling it at constant tension prior to winding it onto a reception reel.

43. A method according to claim 39, characterized in that it includes a step of laminating a coupon (C, P) and in that prior to the laminating step, each coupon (C, P) held by a clamp is inserted into a folder constituted by a doubled film assembly made from two segments of plastics material strip ($P_{11}$, $P_{12}$) fed perpendicularly to the travel direction of the chain and sealed together along a single longitudinal edge thereof, which edge is situated in front of the corresponding coupon (C, P) in the travel direction of the coupon.

44. A method according to claim 39, characterized in that it includes a step of forming and transporting negative coupons (N) each held in a marginal zone at at least two regions thereof that are spaced apart from each other in the travel direction of a closed loop auxiliary chain by means of a clamp transported by the indexed-advance auxiliary chain, a step of forming and transporting positive blank coupons (P) each held in a marginal zone at at least two regions thereof that are spaced apart from each other in the travel direction of the closed loop main chain by means of a clamp transported by the indexed-advance main chain, a step of superposing a negative coupon (N) and a positive blank coupon (P) and of pressing them together, a step of transporting a superposed positive coupon (P) and negative coupon (N) by means of the single clamp transported by the main chain, a step of removing the negative coupon (N) by mechanically unpeeling it, and a step of transporting and treating the positive coupon (P) on its own by means of the clamp transported by the main chain.

45. An installation for manufacturing personalized coupons, the installation comprising a set of work stations with at least a feed station for supplying blank coupons (C, P), a personalization station for personalizing blank coupons (C, P), and a cutting-out station for cutting out personalized coupons (C, P), with a system for transporting coupons (C, P) between the various work stations, the installation being characterized in that the system for transporting coupons (C, P) comprises a carousel having at least one chain driven in indexed manner by motor-driven sprocket wheels, and a set of clamps mounted at a constant pitch on links of the chain and co-operating with opening/closing means placed in fixed positions, so that each clamp takes hold of an individual blank coupon (C, P), transports said coupon (C, P) between the various work stations, and releases the coupon (C, P) in a station for collecting the finished or semi-finished product, each clamp having a pair of jaws for clamping a marginal zone of a blank coupon (C, P) in at least two regions thereof which are spaced apart from each other in the travel direction of the chain, having external abutments secured to one or other of the jaws for laterally positioning the blank coupon (C, P) held between said jaws, and wherein each clamp has vertical external abutments extending upwards and secured to the bottom jaw.

46. A method of manufacturing a run of personalized coupons, the method comprising at least a step of supplying blank coupons (C, P) to a first work station, a step of personalizing the blank coupons (C, P) in a second work station, and a step of cutting out personalized coupons (C, P) in a third work station, the coupons being transported from one work station to another in succession, the method being characterized in that the coupons (C, P) are transported from one work station to another individually by means of clamps mounted at a constant pitch on links of a chain driven in indexed manner round a closed circuit, and in that each clamped and transported coupon (C, P) is held along one of its marginal zones, at least in two regions thereof, which regions are spaced apart from each other in the travel direction of the chain, while nevertheless both co-operating with the same clamp, and wherein each clamp has vertical external abutments extending upwards and secured to the bottom jaw.

* * * * *

UNITED STATES PATENT AND TRADEMARK OFFICE

CERTIFICATE OF CORRECTION

PATENT NO. : 6,652,698 B1

DATED : November 25, 2003

INVENTOR(S) : Jacques Tisserand et al.

It is certified that error appears in the above-identified patent and that said Letters Patent is hereby corrected as shown below:

<u>Column 9,</u>
Line 9, "C4" should read -- $C_4$ --;

<u>Column 10,</u>
Lines 3 and 4, "1" should read -- $\vartheta$ --;

<u>Column 22,</u>
Lines 3 and 22, "(1)" should read -- ($\vartheta$) --.

Signed and Sealed this

Thirty-first Day of August, 2004

JON W. DUDAS

*Director of the United States Patent and Trademark Office*